(12) United States Patent
Ukishima

(10) Patent No.: US 11,820,132 B2
(45) Date of Patent: Nov. 21, 2023

(54) MACHINE LEARNING MODEL GENERATION DEVICE, MACHINE LEARNING MODEL GENERATION METHOD, PROGRAM, INSPECTION DEVICE, INSPECTION METHOD, AND PRINTING DEVICE

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 548 days.

(21) Appl. No.: 17/134,654

(22) Filed: Dec. 28, 2020

(65) Prior Publication Data

US 2021/0114368 A1 Apr. 22, 2021

Related U.S. Application Data

(63) Continuation of application No. PCT/JP2019/026685, filed on Jul. 4, 2019.

(30) Foreign Application Priority Data

Jul. 25, 2018 (JP) .................. 2018-139555

(51) Int. Cl.
*B41J 2/045* (2006.01)
*G06N 20/00* (2019.01)
(Continued)

(52) U.S. Cl.
CPC .......... *B41J 2/0451* (2013.01); *B41J 29/393* (2013.01); *G06N 20/00* (2019.01); *G06T 7/001* (2013.01);
(Continued)

(58) Field of Classification Search
CPC ...... B41J 2/0451; B41J 29/393; B41J 2/2142; B41J 2/2146; G06N 20/00; G06N 3/045;
(Continued)

(56) References Cited

FOREIGN PATENT DOCUMENTS

| JP | 7-333170 A | 12/1995 |
|---|---|---|
| JP | 2008-287378 A | 11/2008 |
| JP | 2014-186442 A | 10/2014 |

OTHER PUBLICATIONS

Yamazaki, Yoshirou, "Printing Result Inspection Device and Method", Sep. 14, 2017, [Abstract, Description of Embodiments] (Year: 2017).*

(Continued)

*Primary Examiner* — Lisa Solomon
(74) *Attorney, Agent, or Firm* — Sughrue Mion, PLLC

(57) ABSTRACT

There is provided a machine learning model generation device, a machine learning model generation method, a program, an inspection device, an inspection method, and a printing device for inspecting a defect of a printed matter with high accuracy. A machine learning model for detecting the defect of the printed matter is generated by using, as learning input information, at least learning inspection data based on a captured image obtained by capturing an image of a printed matter as an inspection target and second learning reference data based on print digital data and using, as learning output information, at least learning defect information of the learning inspection data estimated by performing comparison processing of the learning inspection data and first learning reference data based on a captured image obtained by capturing the image of the printed matter.

20 Claims, 15 Drawing Sheets

(51) Int. Cl.
  *B41J 29/393* (2006.01)
  *G06T 7/00* (2017.01)
  *H04N 1/00* (2006.01)
(52) U.S. Cl.
  CPC ..... *H04N 1/00037* (2013.01); *H04N 1/00045* (2013.01); *G06T 2207/30144* (2013.01)
(58) Field of Classification Search
  CPC ............... G06N 3/084; G06T 7/001; G06T 2207/30144; G06T 2207/10024; G06T 2207/20081; G06T 2207/20084; H04N 1/00037; H04N 1/00045
  See application file for complete search history.

(56) References Cited

OTHER PUBLICATIONS

Vans et al., "Automatic visual inspection and defect detection on variable data prints", Journal of Electronic Imaging, vol. 20, No. 1, p. 13010, Jan. 1, 2011, XP055255728 (13 pages total).
Extended European Search Report dated Jul. 29, 2021 from the European Patent Office in EP Application No. 19840630.8.
International Search Report dated Sep. 24, 2019, issued by the International Searching Authority in application No. PCT/JP2019/026685.
Written Opinion dated Sep. 24, 2019, issued by the International Searching Authority in application No. PCT/JP2019/026685.
International Preliminary Report on Patentability dated Jan. 26, 2021, issued by the International Bureau in application No. PCT/JP2019/026685.

* cited by examiner

MACHINE LEARNING MODEL GENERATION DEVICE, MACHINE LEARNING MODEL GENERATION METHOD, PROGRAM, INSPECTION DEVICE, INSPECTION METHOD, AND PRINTING DEVICE

CROSS-REFERENCE TO RELATED APPLICATIONS

The present application is a Continuation of PCT International Application No. PCT/JP2019/026685 fled on Jul. 4, 2019 claiming priority under 35 U.S.C § 119(a) to Japanese Patent Application No. 2018-139555 filed on Jul. 25, 2018. Each of the above applications is hereby expressly incorporated by reference, in its entirety, into the present application.

BACKGROUND OF THE INVENTION

1. Field of the Invention

The present disclosure relates to a machine learning model generation device, a machine learning model generation method, a program, an inspection device, an inspection method, and a printing device, and particularly relates to a technique of detecting a defect from a printed matter.

2. Description of the Related Art

In printing of a printed matter, a defect such as ink loss, ink dripping, a scratch, and a streak may occur. For this reason, automatic inspection for detecting a defect of a printed matter is performed.

JP2014-186442A discloses an inspection device that determines an image quality of a print image by calculation using, as parameters, feature data of print image data, which is generated by reading a print image printed based on input data, and feature data of a reference image based on the input data.

SUMMARY OF THE INVENTION

The device described in JP2014-186442A has a problem that image structures of the print image and the input data are different due to a difference of image generation sources of the print image and the input data and thus it is difficult to define feature data with high determination accuracy.

The present disclosure has been made in consideration of the above circumstances, and an object of the present disclosure is to provide a machine learning model generation device, a machine learning model generation method, a program, an inspection device, an inspection method, and a printing device capable of inspecting a defect of a printed matter with high accuracy.

In order to achieve the above object, according to an aspect of the present disclosure, there is provided a machine learning model generation method for detecting a defect of a printed matter by comparing, using a machine learning model, inspection data which is acquired based on a captured image obtained by capturing an image of the printed matter and reference data which is acquired based on print digital data, the method including: an acquisition step of acquiring learning inspection data that is based on a captured image obtained by capturing an image of a printed matter as an inspection target which is printed based on learning print digital data, learning defect information of the learning inspection data that is estimated by performing comparison processing of first learning reference data and the learning inspection data, the first learning reference data being based on a captured image obtained by capturing an image of a printed matter as a reference which is printed based on the learning print digital data, and second learning reference data based on the learning print digital data; and a generation step of generating the machine learning model by using at least the learning inspection data and the second learning reference data as learning input information and using at least the learning defect information as learning output information.

According to the aspect, it is possible to generate a machine learning model for inspection using print digital data, and thus it is possible to inspect a defect of a printed matter with high accuracy. The machine learning model generation method corresponds to a machine learning model manufacturing method.

Preferably, the learning defect information includes a discrete value, and, in the generation step, the machine learning model for performing classification is generated. Thereby, it is possible to inspect a defect of a printed matter with high accuracy.

Preferably, the discrete value is a binary discrete value indicating the presence or absence of the defect of the printed matter. Thereby, it is possible to inspect a defect of a printed matter with high accuracy.

Preferably, the discrete value is a ternary or higher discrete value indicating a degree of the defect of the printed matter. Thereby, it is possible to inspect a defect of a printed matter with high accuracy.

Preferably, the learning defect information includes a continuous value, and, in the generation step, the machine learning model for performing regression is generated. Thereby, it is possible to inspect a defect of a printed matter with high accuracy.

Preferably, the learning defect information includes position information of the defect of the printed matter. Thereby, it is possible to inspect a defect of a printed matter with high accuracy.

Preferably, in the generation step, the machine learning model is generated by deep learning. Thereby, it is possible to properly generate a machine learning model.

Preferably, in the generation step, the machine learning model is generated by using at least the first learning reference data and the second learning reference data as learning input information and using at least the learning defect information indicating that a defect does not exist as learning output information. Thereby, it is possible to learn a case where a defect does not exist.

Preferably, in the acquisition step, at least the learning inspection data is acquired, the learning inspection data being obtained by capturing an image of a printed matter printed based on processed print digital data in which a defect is expressed by processing at least a part of the learning print digital data. Thereby, it is possible to collect a large amount of learning data.

Preferably, in the acquisition step, the first learning reference data is acquired, and the method further includes a comparison processing step of estimating the learning defect information of the learning inspection data by performing comparison processing of the learning inspection data and the first learning reference data. Thereby, it is possible to properly acquire the learning defect information.

Preferably, in the comparison processing step, comparison processing is performed by using a comparison-processing machine learning model. Thereby, it is possible to properly estimate the learning defect information.

Preferably, the machine learning model generation method further includes: a sensory evaluation value input step of inputting a sensory evaluation value obtained by comparing a first printed matter as a reference which is printed based on the learning print digital data and a second printed matter as a comparison target which is printed based on the learning print digital data; and a comparison-processing model generation step of generating the comparison-processing machine learning model by using comparison-processing learning reference data obtained by capturing an image of the first printed matter and comparison-processing learning inspection data obtained by capturing an image of the second printed matter as learning input information and using the sensory evaluation value as learning output information. Thereby, it is possible to properly acquire the learning defect information.

In order to achieve the above object, according to another aspect of the present disclosure, there is provided an inspection method including: a defect inspection step of acquiring inspection data based on a captured image obtained by capturing an image of a printed matter as an inspection target which is printed based on print digital data and reference data based on the print digital data and detecting a defect of the printed matter as the inspection target by comparing the inspection data and the reference data by using the machine learning model.

According to the aspect, it is possible to inspect a defect of a printed matter with high accuracy.

In order to achieve the above object, according to still another aspect of the present disclosure, there is provided a machine learning model generation device for detecting a defect of a printed matter by comparing, using a machine learning model, inspection data which is acquired based on a captured image obtained by capturing an image of the printed matter and reference data which is acquired based on print digital data, the device including: an acquisition unit that acquires learning inspection data that is based on a captured image obtained by capturing an image of a printed matter as an inspection target which is printed based on learning print digital data, learning defect information of the learning inspection data that is estimated by performing comparison processing of first learning reference data and the learning inspection data, the first learning reference data being based on a captured image obtained by capturing an image of a printed matter as a reference which is printed based on the learning print digital data, and second learning reference data based on the learning print digital data; and a generation unit that generates the machine learning model by using at least the learning inspection data and the second learning reference data as learning input information and using at least the learning defect information as learning output information.

According to the aspect, it is possible to generate a machine learning model for inspection using print digital data, and thus it is possible to inspect a defect of a printed matter with high accuracy.

In order to achieve the above object, according to still another aspect of the present disclosure, there is provided an inspection device including: the machine learning model generation device described in the above; and a defect inspection unit that acquires inspection data based on a captured image obtained by capturing an image of a printed matter as an inspection target which is printed based on print digital data and reference data based on the print digital data and detects a defect of the printed matter as the inspection target by comparing the inspection data and the reference data by using a machine learning model.

According to the aspect, it is possible to generate a machine learning model for inspection using print digital data, and thus it is possible to inspect a defect of a printed matter with high accuracy.

In order to achieve the above object, according to still another aspect of the present disclosure, there is provided a printing device including: the inspection device; a printing unit that generates a printed matter by performing printing based on the print digital data; a camera that captures an image of the printed matter; and an output unit that outputs a detection result of a defect of the printed matter. According to the aspect, it is possible to inspect a defect of a printed matter, which is generated, with high accuracy.

Preferably, the printing device further includes a processing unit that generates processed print digital data in which a defect is expressed by processing at least a part of the learning print digital data. Further, preferably, the printing unit generates a printed matter with a defect by performing printing based on the processed print digital data, the camera captures an image of the printed matter with a defect, and the acquisition unit acquires, as the learning inspection data, at least data based on a captured image obtained by capturing an image of the printed matter with a defect. Thereby, it is possible to collect a large amount of learning inspection data.

Preferably, the generation unit generates an adjusted machine learning model suitable for the printing device by adjusting a machine learning model by using learning inspection data based on a captured image obtained by capturing an image of a printed matter by the camera. Thereby, it is possible to perform inspection according to a print condition of a customer of the printing device.

Preferably, the printing unit performs printing using an ink jet head. According to the aspect, it is possible to perform inspection of a printed matter obtained by using an ink jet head.

In order to achieve the above object, according to still another aspect of the present disclosure, there is provided a program for causing a computer to execute the machine learning model generation method.

According to the aspect, it is possible to generate a machine learning model for inspection in which comparison with print digital data is performed, and thus it is possible to inspect a defect of a printed matter with high accuracy.

According to the present disclosure, it is possible to inspect a defect of a printed matter with high accuracy.

DESCRIPTION OF THE PREFERRED EMBODIMENTS

Figure 1:
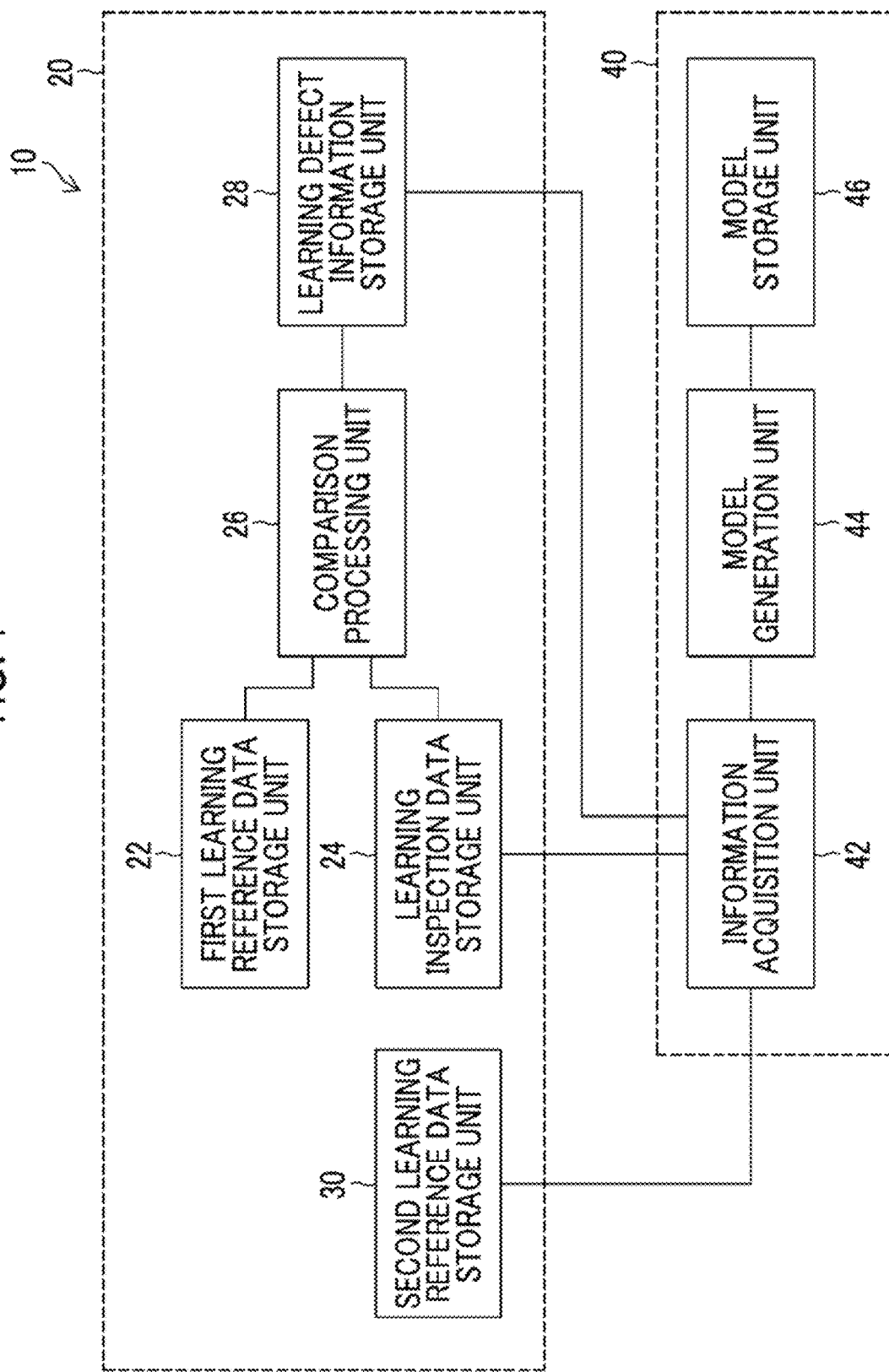
FIG. 1 is a block diagram illustrating a configuration of a machine learning model generation system.

Hereinafter, preferred embodiments of the present disclosure will be described in detail with reference to the accompanying drawings.

<Correct Answer Data Comparison Method and Original Data Comparison Method>

Inspection of a printed matter is performed by obtaining inspection data by reading the printed matter as an inspection target by an image capturing device, and comparing the inspection data with reference data as a reference of inspection. In this specification, this comparison processing is classified into a correct answer data comparison method and an original data comparison method.

In the correct answer data comparison method, comparison with reference data generated from a printed matter is performed. The reference data is acquired based on a captured image obtained by capturing an image of a printed matter having no defect by an image capturing device. By setting an image capturing condition of the reference data to be the same image capturing condition as an image capturing condition of the inspection data, it is possible to relatively reduce an inspection difficulty level as compared with a case of comparing pieces of data generated from different sources.

On the other hand, because it is necessary to capture an image of a printed matter having no defect by an image capturing device, there is a problem that a correct answer data comparison method cannot be used in a job for only one page and variable print in which the number of print pages of each machine is one page. In addition, it is necessary to define how to obtain the reference data for each print type such as normal print, gathering print, and back-surface print, and as a result, there is a problem that the conditions become complicated.

Further, in a case where there is a defect in the reference data, in some cases, non-detection in which a portion of the inspection data with a defect is not determined as a defect may occur, or erroneous detection in which a portion of the inspection data without a defect is determined as a defect may occur.

In order to deal with these situations, it is necessary to adopt the original data comparison method. In the original data comparison method, comparison with the acquired reference data is performed without printing. The reference data is acquired from digital image data which is input to a printing device, or is acquired by performing, on the digital image data, various pre-processing such as resolution conversion, color conversion, gradation conversion, screening processing, and statistical processing.

In the original data comparison method, it is possible to perform an inspection in a job for only one page and variable print, which cannot be realized in the correct answer data comparison method. Further, it is easy to correspond to each print type.

On the other hand, since the inspection data and the reference data are generated from different data sources, characteristics of the inspection data and the reference data are largely different. As a result, there is a problem that an inspection difficulty level of the original data comparison method is relatively high as compared with the correct answer data comparison method.

<Use of Machine Learning Technique and Ensuring of Learning Data>

In recent years, machine learning techniques have made great progress, and under a condition that there is a large amount of high quality learning data, it is known that pattern recognition by latest machine learning such as deep learning can obtain better performance than pattern recognition using features designed by humans.

In order to obtain high performance of defect inspection in deep learning, a large amount of high quality learning data is required. On the other hand, in a case of acquiring a degree of a defect by human sensory evaluation, a large number of man-hours is required for sensory evaluation, and as a result, there is a problem that it is difficult to acquire a large amount of learning data. Further, in sensory evaluation, evaluation values are likely to vary, and as a result, there is a problem that it is difficult to acquire high-quality learning data.

Therefore, by performing defect inspection by the correct answer data comparison method, a large amount of high-quality learning data is relatively easily acquired. The correct answer data comparison method has an advantage that the number of man-hours required for automatic evaluation is small and thus a large amount of learning data can be easily acquired. Further, the correct answer data comparison method has an advantage that a variation in result is small by objective evaluation and thus high-quality learning data can be easily acquired.

First Embodiment

A machine learning model generation system according to a first embodiment generates a machine learning model for detecting a defect of a printed matter by comparing inspection data, which is acquired based on a captured image obtained by capturing an image of a printed matter, and reference data, which is acquired based on print digital data by using a machine learning model.

In this specification, a term "defect" is a concept that includes everything printed in a state where there is an unintended change from an original print state, such as ink loss, ink dripping, oil dripping, dust adhesion, other spot-shaped defects, unevenness, color variation, character loss, scratches, change in glossiness, wrinkles, streak-shaped defects due to a defective nozzle of ink jet nozzles, streak-shaped defects due to failure of correction of a defective nozzle, and paper deformation such as wrinkles.

[Configuration of Machine Learning Model Generation System and Machine Learning Model Generation Procedure]

Figure 2:
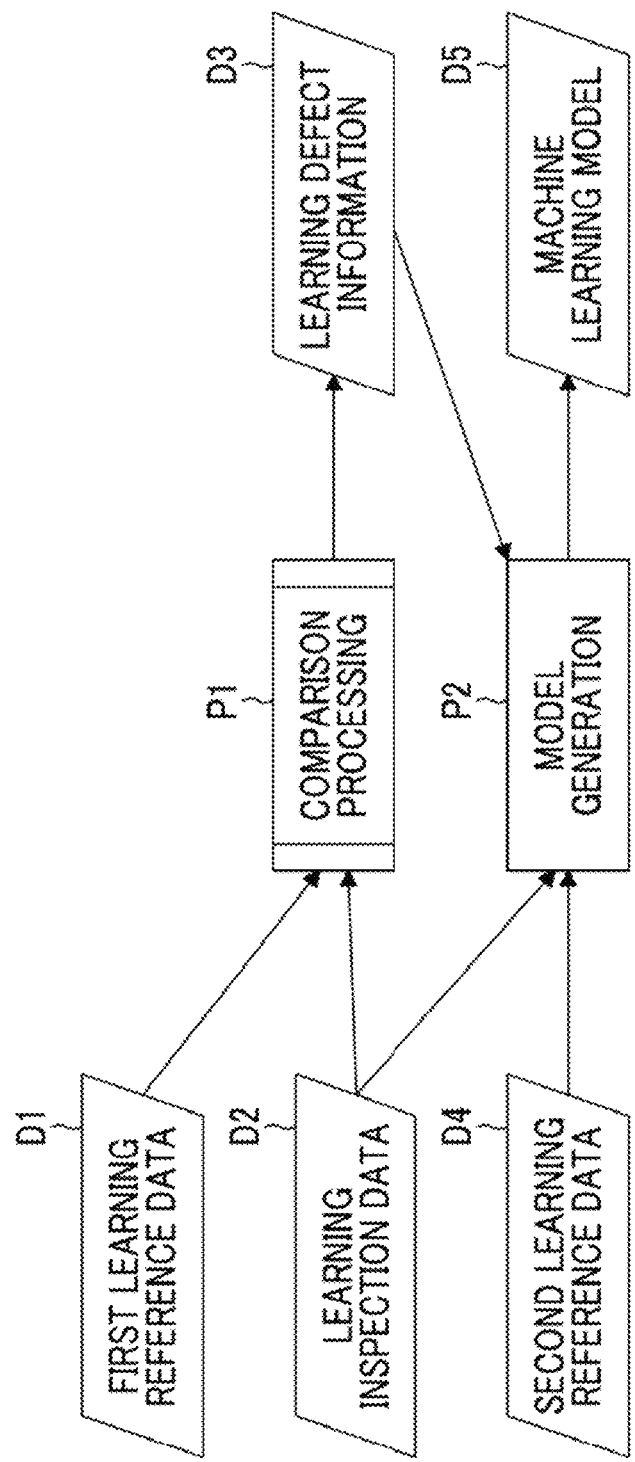
FIG. 2 is a flowchart illustrating a machine learning model generation procedure.

FIG. 1 is a block diagram illustrating a configuration of a machine learning model generation system. FIG. 2 is a flowchart illustrating a machine learning model generation procedure.

The generation system 10 includes a learning information generation device 20 and a model generation device 40.

The learning information generation device 20 includes a first learning reference data storage unit 22, a learning inspection data storage unit 24, a comparison processing unit 26, a learning defect information storage unit 28, and a second learning reference data storage unit 30.

The first learning reference data storage unit 22 is a memory that stores first learning reference data D1. The first learning reference data D1 is data based on a captured image obtained by capturing an image of a printed matter without a defect (a printed matter having no defect) by an image capturing device (not illustrated).

The learning inspection data storage unit 24 is a memory that stores learning inspection data D2. The learning inspection data D2 is data based on a captured image obtained by capturing an image of a printed matter with a defect by an image capturing device (not illustrated) and data based on a captured image obtained by capturing an image of a printed matter without a defect by an image capturing device (not illustrated).

The first learning reference data D1 and the learning inspection data D2 may be the captured images itself or may be data obtained by performing certain pre-processing on the captured images. As pre-processing for the captured image, various image processing such as color conversion, gradation conversion, resolution conversion, and filtering may be used, or profile data generated by calculating a statistic value such as an average value, a median value, a maximum value, or a minimum value of the image in a vertical direction and a horizontal direction may be used. Further, feature data extracted by frequency analysis or statistical analysis may be used.

The pre-processing may be performed on the captured image in the learning information generation device 20, and the pre-processed first learning reference data D1 and the pre-processed learning inspection data D2 may be acquired from an external device via an interface (not illustrated).

In the first learning reference data D1 and the learning inspection data D2, a pair of the first learning reference data D1 and the learning inspection data D2 respectively based on the same learning print digital data are present. That is, among printed matters printed based on the same learning print digital data, the first learning reference data D1, which is acquired from a captured image of a printed matter without a defect, and the learning inspection data D2, which is acquired from a captured image of a printed matter with a defect or a printed matter without a defect, form a pair. Here, the learning print digital data refers to print digital data used for learning. Thus, the learning print digital data is not limited to print digital data specially generated for learning, and may be print digital data used for inspection of the printed matter.

The image capturing device used to acquire the first learning reference data D1 and the learning inspection data D2 may be any image capturing device. For example, a line scanning camera may be used, or a camera in which optical elements are two-dimensionally arranged may be used. A monochrome camera which cannot acquire color information may be used, or a camera which can acquire color information such as red, green, blue (RGB) information or spectral information may be used. An optimum camera may be selected according to a defect to be detected.

Preferably, a plurality of pieces of the learning inspection data D2 and a plurality of pieces of the first learning reference data D1 paired with the learning inspection data D2 are acquired from the same image capturing device (device having the same serial number). Thereby, a difficulty level of comparison processing P1 to be described is reduced, and thus it becomes easy to obtain high-quality learning defect information D3 to be described.

It is not always necessary to acquire all of the plurality of pieces of the learning inspection data D2 and the plurality of pieces of the first learning reference data D1 paired with the learning inspection data D2 from the same image capturing device. The pair of the first learning reference data D1 and the learning inspection data D2 may be acquired from different image capturing devices having almost the same image capturing characteristics. For example, in a case where a plurality of image capturing devices, which have substantially the same optical element characteristics, substantially the same lighting characteristics, and substantially the same geometrical conditions of elements and have substantially the same image capturing characteristics, are prepared and work is performed in parallel, the plurality of pieces of the learning inspection data D2 and the plurality of pieces of the first learning reference data D1 paired with the learning inspection data D2 can be acquired in a short time and in large quantity.

Further, in order to acquire a large number of images, image capturing devices having different image capturing characteristics may be used. A machine learning model generated in this case has characteristics that are robust to image capturing characteristics, and is used for machine learning. Thus, in a machine learning model use procedure, the inspection data can be acquired by using the image capturing devices having various image capturing characteristics. Here, in a case where inspection performance is prioritized, it is desirable to use image capturing devices having almost the same image capturing characteristics.

Similarly, the printing device used to acquire the first learning reference data D1 and the learning inspection data D2 may be any printing device. Further, preferably, a plurality of pieces of the learning inspection data D2 and a plurality of pieces of the first learning reference data D1 paired with the learning inspection data D2 are acquired from the same printing device. On the other hand, the learning inspection data D2 and the first learning reference data D1 may be acquired from different printing devices.

The comparison processing unit 26 is an arithmetic unit that performs comparison processing P1 as defect inspection of a printed matter. The comparison processing P1 is processing of estimating learning defect information D3 by comparing a pair of the first learning reference data D1 and the learning inspection data D2.

Both of the first learning reference data D1 and the learning inspection data D2 are based on a captured image captured by the image capturing device. Thus, in the comparison processing P1, even in a case where simple comparison processing of the correct answer data comparison method is used, defect inspection can be performed with relatively high accuracy and with few non-detection and erroneous detection. Further, the comparison processing P1 is automatic inspection, and thus a large amount of learning defect information D3 can be easily acquired by preparing images.

For example, in a case where the first learning reference data D1 is the captured image itself and the learning inspection data D2 is the captured image itself, as a specific example of the comparison processing P1, the following processing may be considered. That is, in the comparison processing P1, a defect portion of the printed matter is extracted by obtaining a difference image between the first learning reference data D1 and the learning inspection data D2 and performing threshold value processing on the obtained difference image. Further, in the comparison processing P1, the learning defect information D3 is output from the extracted defect portion. The comparison processing P1 is not limited to processing using difference processing and threshold value processing, and processing of obtaining the learning defect information D3 may be appropriately applied.

For example, as the learning defect information D3, the following information (1) to (7) may be applied.

(1) Binary Information Indicating Presence or Absence of Defect

A binary discrete value indicating the presence or absence of the defect of the printed matter may be used. For example, in a case where there is no defect (in a case where a defect does not exist), the binary discrete value is defined as 0, and in a case where there is a defect, the binary discrete value is defined as 1. The binary discrete value is used as data classified by machine learning.

(2) Information Indicating Type of Defect

A ternary discrete value indicating type information of a defect may be used. For example, in a case where there is no defect, the ternary discrete value is defined as 0, in a case where there is a streak-shaped defect, the ternary discrete value is defined as 1, and in a case where there is a spot-shaped (also referred to as point-shaped, speck-shaped, or dot-shaped) defect, the ternary discrete value is defined as 2. The defect types may be further increased.

(3) Information Indicating Degree of Defect

A degree of a defect is defined as continuous values. In a case where there is no defect, the continuous value is set to 0, and in a case where there is a defect, as a degree of the defect is larger, that is, as it is easier to visually recognize the defect, the continuous value is set to a larger number. For example, a degree of a defect is defined as continuous values of 0 to 10. In this case, in the machine learning model, regression is performed.

Alternatively, a categorized ternary or higher discrete value indicating a degree of a defect of a printed matter may be used. For example, in a state where a degree of a defect is defined by categorized ternary discrete values of 0, 1, and 2, in a case where there is no defect, a degree of the defect is set to 0, in a case where there is a small defect, a degree of the defect is set to 1, and in a case where there is a large defect, a degree of the defect is set to 2. In this case, in the machine learning model, classification is performed. The categorized values may be ternary or higher discrete values.

(4) Information Indicating Position of Defect

Information including position information of the defect of the printed matter may be used. For example, the information is defined as data obtained by converting a position coordinate into a value. Alternatively, the information is defined as image information in which a non-defect position is set to 0 and a defect position is set to 1.

(5) Image Information Including Both of Information Indicating Degree of Defect and Information Indicating Position of Defect For example, image information in which a non-defect position is set to 0 and a continuous value or a discrete value indicating a degree value of a defect is set to a defect position is defined.

(6) Image Information Including Both of Information Indicating Type of Defect and Information Indicating Position of Defect For example, image information in which a non-defect position is set to 0 and information indicating a type of a defect is set to a defect position is defined.

(7) Multi-Channel Image Information Including all of Information Indicating Degree of Defect, Information Indicating Type of Defect, and Information Indicating Position of Defect For example, an image including a first channel in which information indicating a degree of a streak-shaped defect and information indicating a position of the streak-shaped defect are set is defined, and an image including a second channel in which information indicating a degree of a spot-shaped defect and information indicating a position of the spot-shaped defect are set is defined.

The learning defect information D3 is not limited to the above information (1) to (7) as long as the information is information indicating a characteristic of a defect. The learning defect information D3 may have a plurality of types. For example, the learning defect information D3 may include (1) binary information indicating the presence or absence of a defect and (4) information indicating a position of a defect, or may include (1) binary information indicating the presence or absence of a defect, (3) information indicating a degree of a defect, and (4) information indicating a position of a defect, pieces of the information being described in the above examples.

The learning defect information storage unit 28 is a memory that stores the learning defect information D3 acquired by the comparison processing unit 26.

The second learning reference data storage unit 30 is a memory that stores second learning reference data D4. The second learning reference data D4 is data based on learning print digital data which is used in a case of printing the printed matters of the first learning reference data D1 and the learning inspection data D2.

The second learning reference data D4 is not derived from a captured image obtained by capturing an image of a printed matter, but is the learning print digital data itself or data obtained by performing certain pre-processing on the learning print digital data. As pre-processing for the learning print digital data, various image processing such as color conversion, gradation conversion, resolution conversion, and filtering may be used, or profile data generated by calculating a statistic value such as an average value, a median value, a maximum value, or a minimum value of the image in a vertical direction and a horizontal direction may be used. Further, feature data extracted by frequency analysis or statistical analysis may be used.

The pre-processing may be performed on the learning print digital data in the learning information generation device 20, and the pre-processed second learning reference data D4 may be acquired from an external device via an interface (not illustrated).

Further, the model generation device 40 includes an information acquisition unit 42, a model generation unit 44, and a model storage unit 46.

The information acquisition unit 42 is an input interface that acquires the learning inspection data D2, the learning defect information D3, and the second learning reference data D4 from the learning information generation device 20. The information acquisition unit 42 acquires the learning inspection data D2 and the second learning reference data D4 as learning input information, and acquires the learning defect information D3 as learning output information. Here, the learning input information corresponds to an explanation variable, and the learning output information corresponds to an objective variable.

The model generation unit 44 is an arithmetic unit that performs model generation processing P2. The model generation processing P2 is processing of generating a machine learning model D5 using an original data comparison method, from the learning inspection data D2 and the second learning reference data D4 as learning input information and the learning defect information D3 as learning output information. In the model generation processing P2, as the learning input information, at least information based on the learning inspection data D2 and information based on the second learning reference data D4 may be used, and, as the learning output information, at least information based on the learning defect information D3 may be used.

For machine learning, any method such as multiple regression analysis, support vector machine, a partial least-square method, and deep learning may be used. In deep learning, feature data used for pattern recognition is also automatically extracted. By using a large amount of the high-quality learning defect information D3 acquired by the learning information generation device 20, it is possible to generate a machine learning model having high inspection performance. Here, in the model generation processing P2, a machine learning model D5 is generated by deep learning.

The learning inspection data D2 is used in both of the comparison processing P1 in the learning information generation device 20 and the model generation processing P2 in the model generation device 40. On the other hand, the learning inspection data D2 used for the comparison processing P1 and the learning inspection data D2 used for the model generation processing P2 do not necessarily have to be subjected to the same pre-processing. That is, the learning inspection data D2 used for the comparison processing P1 and the learning inspection data D2 used for the model generation processing P2 may be data obtained by performing different pre-processing on a captured image obtained by capturing an image of a printed matter without a defect by an image capturing device. The greatest advantage of the present embodiment is that a large amount of the learning defect information D3 can be accurately generated by the comparison processing P1. Thus, there is no problem even in a case where different pre-processing is respectively performed.

Further, the learning defect information D3 generated in the comparison processing P1 and the learning defect information D3 used in the model generation processing P2 do not necessarily have to be the same, and the learning output information used in the model generation processing P2 may be generated based on the learning defect information D3. Since the comparison processing P1 and the model generation processing P2 are different processing, the learning defect information D3 generated in the comparison processing P1 and the learning defect information D3 used in the model generation processing P2 may be defined in a format suitable for each processing.

Further, in the model generation processing P2, at least the learning output information generated based on the learning defect information D3 may be used. For example, the learning output information generated based on sensory evaluation may be used together.

As described above, the learning defect information D3 may have a plurality of types such as the presence or absence of a defect and a position of a defect. On the other hand, in this case, a plurality of types of the learning output information are also defined. A use method in a case where the learning output information has a plurality of types will be described by taking deep learning as an example.

In deep learning, an input layer based on the learning input information and an output layer based on the learning output information can be defined. In deep learning, an intermediate layer such as a convolution layer and a pooling layer is defined between the input layer and the output layer, and various parameters in the intermediate layer are updated by a technique called back propagation from an error in the output layer. Thus, learning is performed such that the error in the output layer is reduced. In addition, in deep learning, the layers can be separated or combined in the middle. Thus, a plurality of output layers can be defined by separating the layers in the middle. For example, in a case where two output layers are defined, an error on the presence or absence of a defect can be calculated in a first output layer, and an error on a position of a defect can be calculated in a second output layer. Further, in a state where a sum of the two errors is defined as the final error amount, by performing back propagation, the parameters are updated such that both of the error on the presence or absence of a defect and the error on a position of a defect are reduced. In this way, the model generation processing P2 using the plurality of types of the learning output information can be performed.

The model storage unit 46 is a memory that stores the machine learning model D5 generated by the model generation unit 44.

The generation system 10 configured as described above generates the machine learning model D5 as follows (an example of a generation method of the machine learning model). That is, the information acquisition unit 42 acquires the first learning reference data D1, the learning inspection data D2, and the second learning reference data D4 (an example of an acquisition step). In addition, the comparison processing P1 is performed on a pair of the first learning reference data D1 and the learning inspection data D2, and thus the learning defect information D3 is acquired (an example of a comparison processing step). Further, the model generation unit 44 performs the model generation processing P2 of generating the machine learning model D5 by using, as the learning input information, at least information based on the learning inspection data D2 and information based on the second learning reference data D4 and using, as the learning output information, at least information based on the learning defect information D3 (an example of a generation step). Thereby, it is possible to generate a machine learning model capable of performing defect inspection using an original data comparison method with high accuracy and with less effort.

It is desirable to acquire the first learning reference data D1 based on a captured image that does not include a defect as a detection target in all captured images. In a case where the first learning reference data D1 includes a defect as a detection target, in the comparison processing using the correct answer data comparison method, non-detection and erroneous detection may occur at a defect portion. As a result, erroneous information may be included in the learning defect information D3, and this adversely affects performance of the machine learning model D5 generated in the model generation processing P2.

In the learning defect information D3, in a case where a ratio of the erroneous information is sufficiently smaller than a ratio of normal information, the adverse effect may be small, and this may not be a practical problem. On the other hand, basically, erroneous information generated in such a procedure should be excluded as much as possible. As a method of confirming whether or not there is a defect in the first learning reference data D1, a method of visually confirming a printed matter or a method of displaying a captured image on a display and visually confirming the captured image may be used. The visual confirmation may be performed only on the printed matter of the first learning reference data D1. The visual confirmation does not need to be performed on the printed matter of the learning inspection data D2, and thus a burden of the visual check can be significantly reduced.

[Configuration of Printed-Matter Inspection Device and Machine Learning Model Use Procedure]

Figure 3:
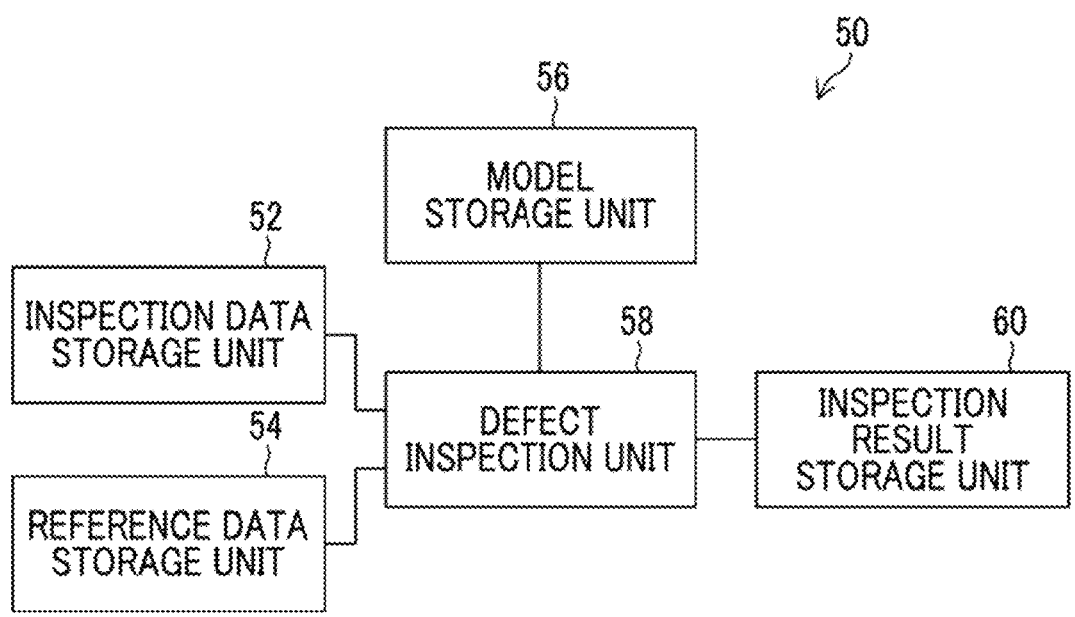
FIG. 3 is a block diagram illustrating a configuration of a printed-matter inspection device.
Figure 4:
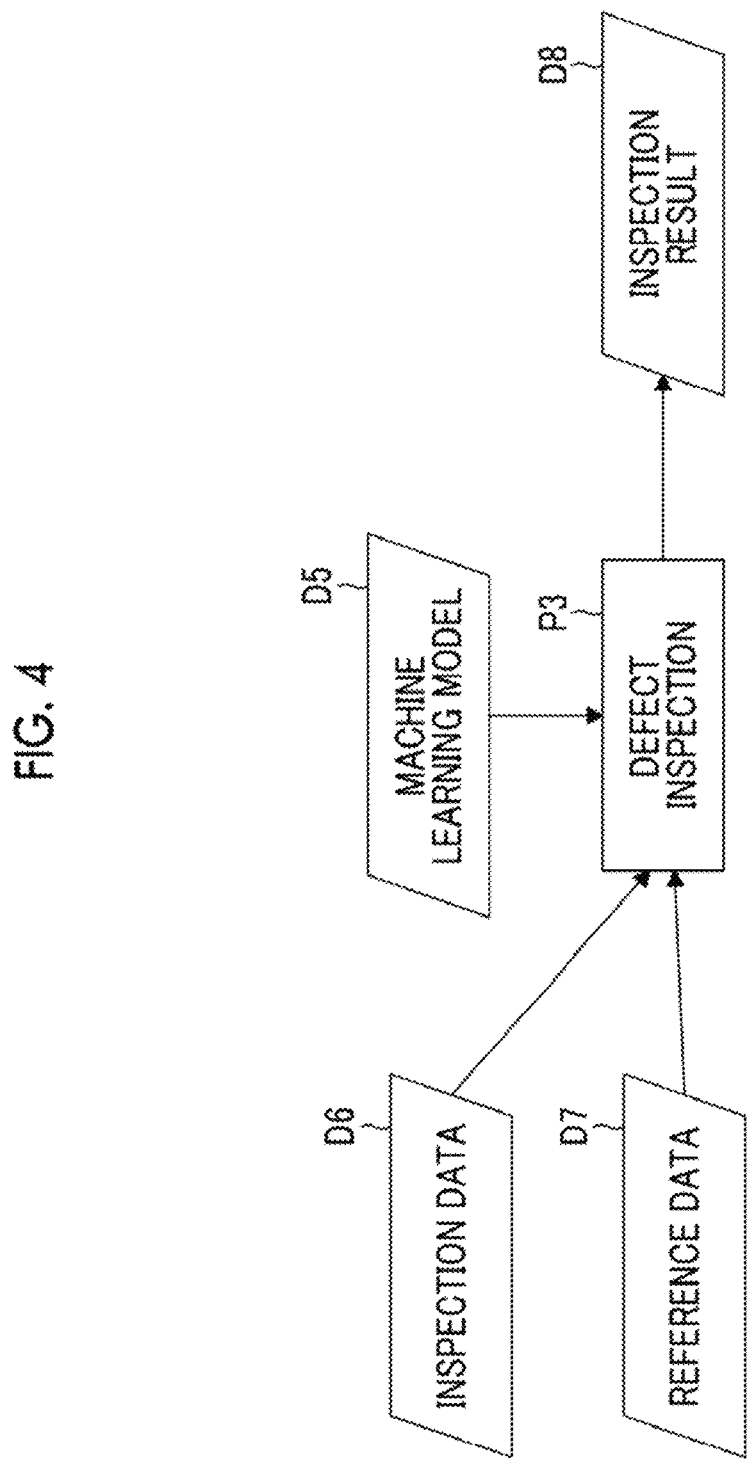
FIG. 4 is a flowchart illustrating a machine learning model use procedure.

FIG. 3 is a block diagram illustrating a configuration of a printed-matter inspection device. FIG. 4 is a flowchart illustrating a machine learning model use procedure.

The printed-matter inspection device 50 is a device that performs inspection of a printed matter by using the machine learning model D5. The printed-matter inspection device 50 includes an inspection data storage unit 52, a reference data storage unit 54, a model storage unit 56, a defect inspection unit 58, and an inspection result storage unit 60.

The inspection data storage unit 52 is a memory that stores inspection data D6. The inspection data D6 is data based on a captured image obtained by capturing an image of a printed matter as an inspection target by an image capturing device.

Similar to the first learning reference data D1 and the learning inspection data D2, the inspection data D6 may be the captured image itself or may be data obtained by performing certain pre-processing on the captured image. The inspection data D6 may be generated from the captured image in the printed-matter inspection device 50, or may be acquired from an external device via an interface (not illustrated).

The inspection data D6 is acquired from an image capturing device. On the other hand, it is not always necessary to use the same image capturing device as the image capturing device used to acquire the first learning reference data D1 and the learning inspection data D2. In a case where an image capturing device, which has substantially the same image capturing characteristics as the image capturing device used in the generation procedure of the machine learning model D5, is used, defect inspection having sufficient performance can be performed.

Further, in a state where, in the generation procedure of the machine learning model D5, a model which is robust to image capturing characteristics can be generated from a large amount of learning data by using image capturing devices having various image capturing characteristics, even in a case where image capturing devices having different image capturing characteristics are used in the model use procedure, defect inspection having sufficient performance can be performed.

The reference data storage unit 54 is a memory that stores reference data D7. The reference data D7 is data based on print digital data used in a case of printing a printed matter of the inspection data D6. The reference data D7 may be print digital data itself, or may be data obtained by performing certain pre-processing on the print digital data. As pre-processing for the print digital data, various image processing such as color conversion, gradation conversion, resolution conversion, and filtering may be used, or profile data generated by calculating a statistic value such as an average value, a median value, a maximum value, or a minimum value of the image in a vertical direction and a horizontal direction may be used. Further, feature data extracted by frequency analysis or statistical analysis may be used.

The pre-processing may be performed on the print digital data in the printed-matter inspection device 50, and the pre-processed reference data D7 may be acquired from an external device via an interface (not illustrated).

The model storage unit 56 is a memory that stores the machine learning model D5. The printed-matter inspection device 50 acquires the machine learning model D5 stored in the model storage unit 46 of the model generation device 40, and stores the machine learning model D5 in the model storage unit 56.

The defect inspection unit 58 is an arithmetic unit that performs defect inspection processing P3. The defect inspection processing P3 is processing of performing defect inspection of a printed matter by applying the inspection data D6 and the reference data D7, which are input, to the machine learning model D5 and acquiring an inspection result D8.

The inspection result storage unit 60 is a memory that stores the inspection result D8.

The printed-matter inspection device 50 configured as described above performs defect inspection as follows (an example of an inspection method). That is, the defect inspection unit 58 performs defect inspection processing P3 by applying the inspection data D6 and the reference data D7, which are input, to the machine learning model D5, and generates an inspection result D8 (an example of a defect inspection step).

The defect inspection of the printed matter may be performed immediately after the inspection data D6 is acquired by using an online image capturing device at the time of printing the printed matter, or may be performed after the inspection data D6 is printed and is captured after printing. Alternatively, the defect inspection may be performed after the inspection data D6 is acquired by an offline image capturing device after printing.

As described above, by providing the machine learning model D5 generated by the model generation device 40 to the printed-matter inspection device 50, defect inspection by the original data comparison method can be performed, and defect inspection for a one-page printed matter such as variable print can be performed.

In printing, in many cases, "paper" is used as a print medium. On the other hand, the print medium according to the present embodiment is not limited to paper. For example, the present embodiment may be applied to a printed matter printed on a transparent medium sheet, or may be applied to a printed matter printed on any other medium.

Second Embodiment

In the first embodiment, as the learning inspection data D2 without a defect, data based on a captured image obtained by capturing an image of a printed matter without a defect by an image capturing device (not illustrated) is used. On the other hand, as the learning inspection data D2 without a defect, the first learning reference data D1 may be used. This is because the first learning reference data D1 is generated based on a captured image obtained by capturing an image of a printed matter without a defect.

[Configuration of Machine Learning Model Generation System and Machine Learning Model Generation Procedure]

Figure 5:
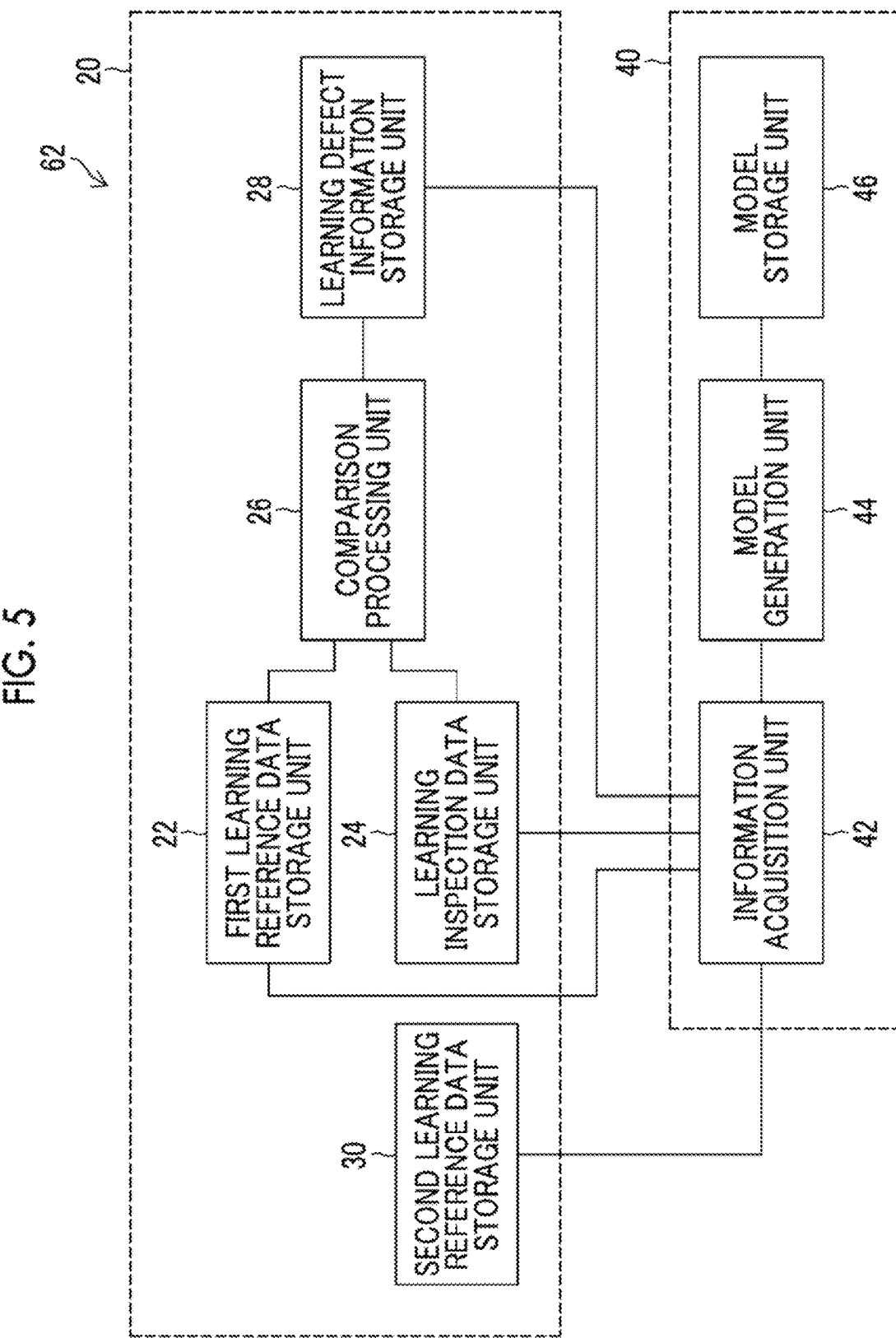
FIG. 5 is a block diagram illustrating a configuration of a machine learning model generation system.
Figure 6:
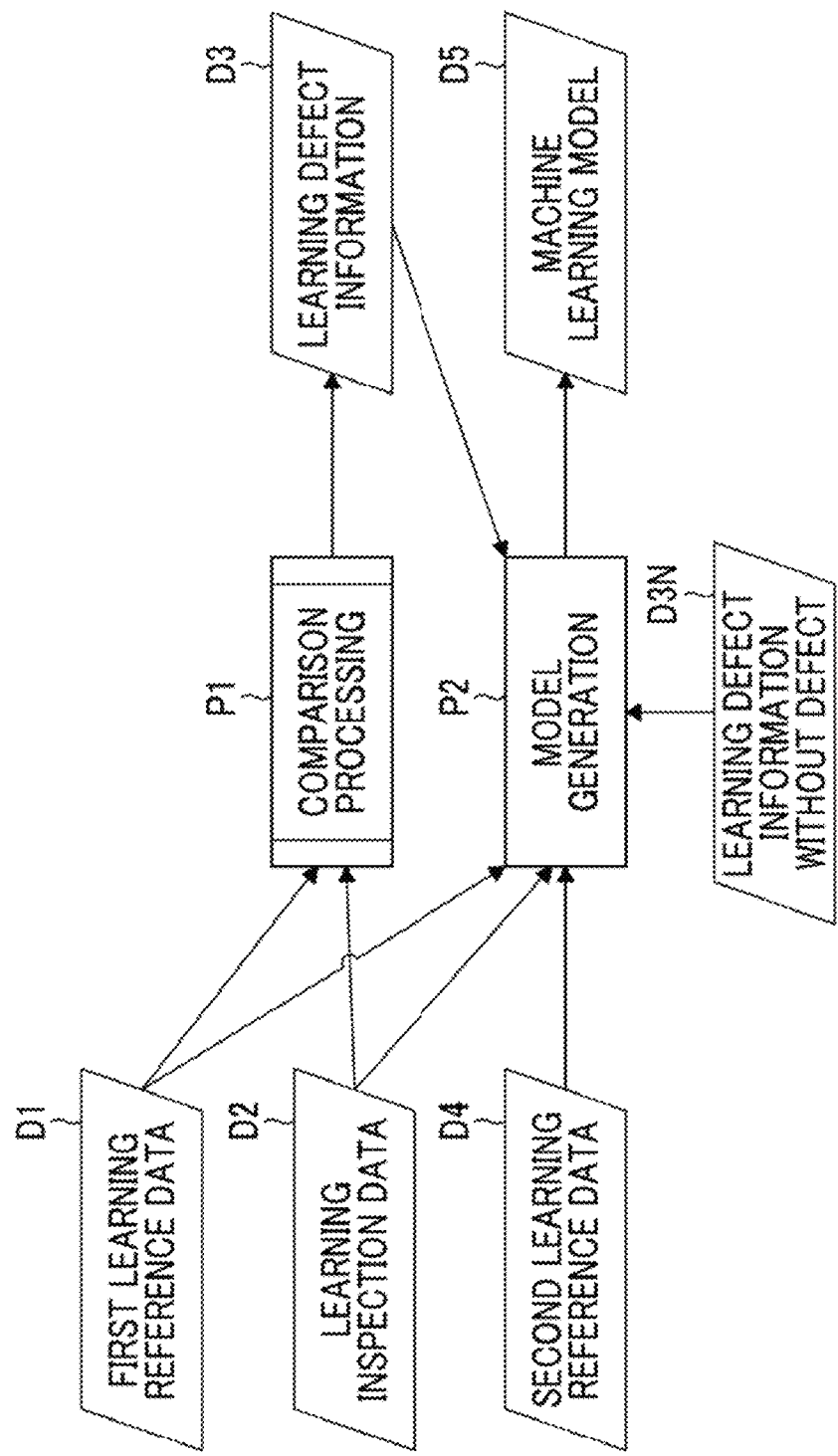
FIG. 6 is a flowchart illustrating a machine learning model generation procedure.

FIG. 5 is a block diagram illustrating a configuration of a machine learning model generation system. FIG. 6 is a flowchart illustrating a machine learning model generation procedure. The same portions as those in FIGS. 1 and 2 are denoted by the same reference numerals, and a detailed description thereof will be omitted.

A generation system 62 uses, as the learning inspection data D2 without a defect, the first learning reference data D1. In the generation system 62, the first learning reference data storage unit 22 of the learning information generation device 20 and the information acquisition unit 42 of the model generation device 40 are connected to each other. The information acquisition unit 42 acquires, as the learning input information, the first learning reference data D1.

The learning defect information D3 paired with the learning inspection data D2 without a defect may be generated by performing the comparison processing P1, or may be generated without passing through the comparison processing P1. In a case where the learning defect information D3 is generated without passing through the comparison processing P1, learning defect information D3N without a defect is generated and input to the information acquisition unit 42. The reason why the learning defect information D3N without a defect can be generated without passing through the comparison processing P1 is that a defect does not exist.

For example, in a case where the learning defect information D3 is "information indicating a degree of a defect", the comparison processing P1 is required to obtain a degree of a defect in a case where a defect exists. On the other hand, in a case where a defect does not exist, it is sufficient to generate information indicating that a degree of a defect is zero, and thus the comparison processing P1 is not always required. Further, for example, in a case where the learning defect information is "information indicating a position of a defect", the comparison processing P1 is required to obtain a position of a defect in a case where a defect exists. On the other hand, in a case where a defect does not exist, it is sufficient to generate information indicating that there is no defect at all positions, and thus the comparison processing P1 is not always required.

Similar to the first embodiment, the model generation unit 44 performs model generation processing P2 based on the learning inspection data D2 and the second learning reference data D4 as learning input information and the learning defect information D3 as learning output information. In a case where the first learning reference data D1 is used as the learning inspection data D2 without a defect and the comparison processing P1 is not performed, the learning defect information D3N without a defect is used.

By performing the model generation processing P2 in this way, it is possible to generate a machine learning model D5 obtained by learning a type of data with a defect and a type of data without a defect.

In the present embodiment, the first learning reference data D1 is used in both of the comparison processing P1 and the model generation processing P2. On the other hand, the first learning reference data D1 used for the comparison processing P1 and the first learning reference data D1 used for the model generation processing P2 do not necessarily have to be subjected to the same pre-processing. That is, the first learning reference data D1 used for the comparison processing P1 and the first learning reference data D1 used for the model generation processing P2 may be data obtained by performing different pre-processing on a captured image obtained by capturing an image of a printed matter without a defect by an image capturing device.

Third Embodiment

[Use of Sensory Value in Comparison Processing (Correct Answer Data Comparison Method)]

A defect in printing cannot always be defined only by the presence or absence of a defect as a physical quantity. For example, in a single-pass ink jet printing device, a streak-shaped defect may occur on a printed matter due to curved ejection of each nozzle, and visibility of the streak changes according to a curved amount of the curved ejection. In a case where the curved amount is small, even though there are very-fine streaks, the streaks cannot be visually recognized by human eyes. On the other hand, in a case where the curved amount is large, the streak can be visually recognized by human eyes. Since there are almost no nozzles in which the curved amount of curved ejection is nonexistent, it is important to determine whether or not there is a defect based on a degree of visibility.

Further, a relationship between characteristics of a human visual system and characteristics of an image capturing device is extremely non-linear. For this reason, by the simple comparison processing based on the difference described above, even though the correct answer data comparison method is used, it is difficult to acquire defect information that is properly correlated with human visibility.

Therefore, by applying machine learning to the comparison processing (correct answer data comparison method) and using a human sensory evaluation value as the learning output information, defect information that is properly correlated with human visibility can be acquired.

Figure 7:
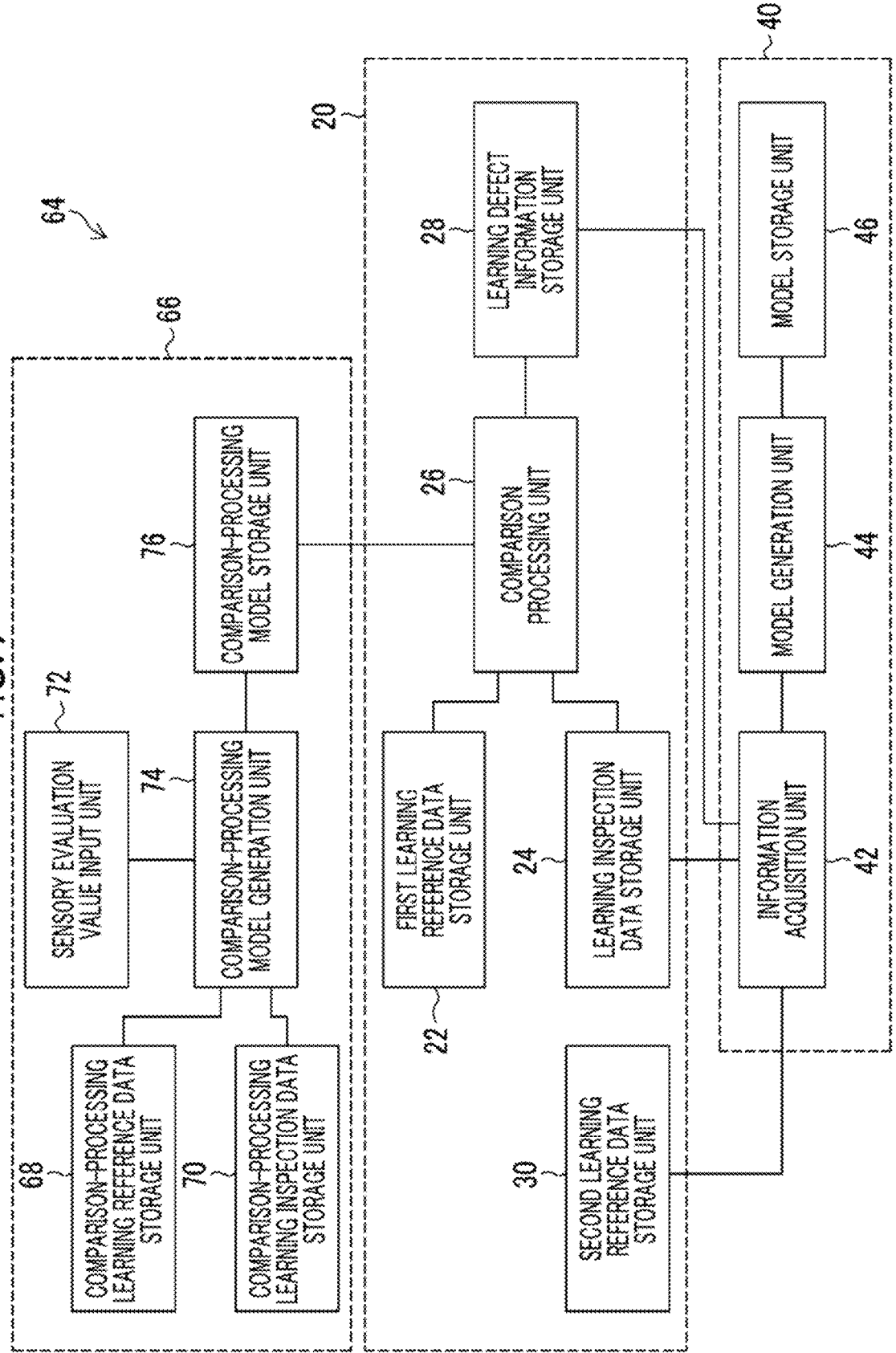
FIG. 7 is a block diagram illustrating a configuration of a machine learning model generation system.
Figure 8:
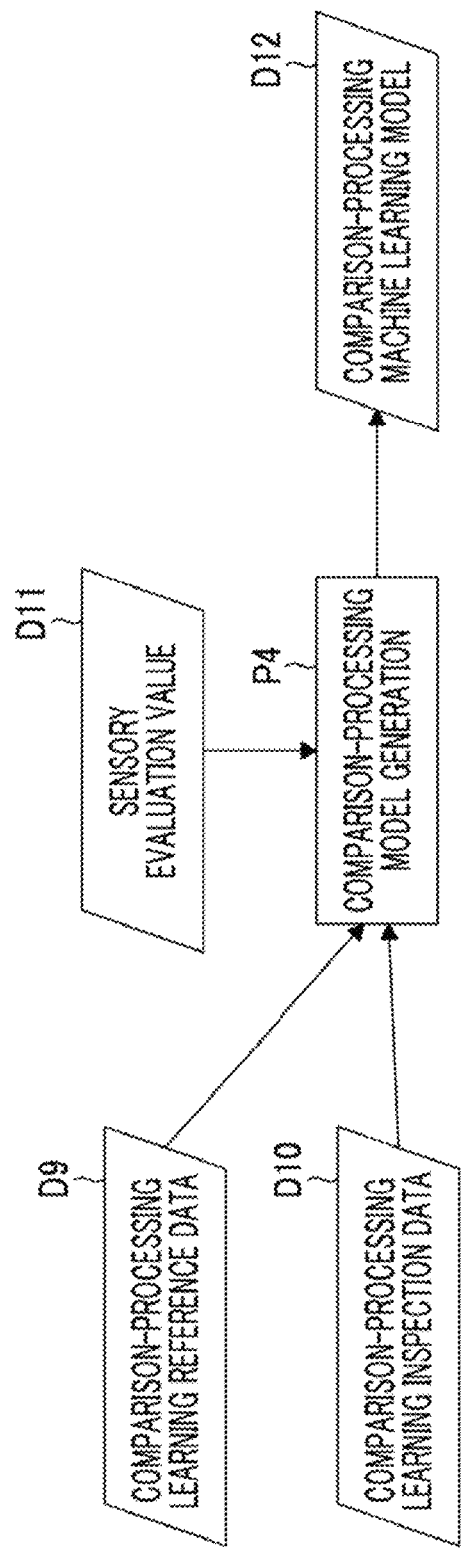
FIG. 8 is a flowchart illustrating a comparison-processing machine learning model generation procedure.

FIG. 7 is a block diagram illustrating a configuration of a machine learning model generation system. The same portions as those in FIG. 1 are denoted by the same reference numerals, and a detailed description thereof will be omitted. FIG. 8 is a flowchart illustrating a comparison-processing machine learning model generation procedure.

A generation system 64 uses a comparison-processing machine learning model D12 in the comparison processing P1. The generation system 64 includes a comparison-processing model generation device 66. The comparison-processing model generation device 66 includes a comparison-processing learning reference data storage unit 68, a comparison-processing learning inspection data storage unit 70, a sensory evaluation value input unit 72, a comparison-processing model generation unit 74, and a comparison-processing model storage unit 76.

The comparison-processing learning reference data storage unit 68 is a memory that stores comparison-processing learning reference data D9. The comparison-processing learning reference data D9 is data based on a captured image obtained by capturing an image of a first printed matter as a reference by an image capturing device (not illustrated).

The comparison-processing learning inspection data storage unit 70 is a memory that stores comparison-processing learning inspection data D10. The comparison-processing learning inspection data D10 is data based on a captured image obtained by capturing an image of a second printed matter as a comparison target by an image capturing device (not illustrated).

In the comparison-processing learning reference data D9 and the comparison-processing learning inspection data D10, a pair of the comparison-processing learning reference data D9 and the comparison-processing learning inspection data D10 based on the same print digital data are present. That is, among printed matters printed based on the same print digital data, the comparison-processing learning reference data D9, which is acquired from a captured image of a first printed matter without a defect as a reference, and the comparison-processing learning inspection data D10, which is acquired from a captured image of a second printed matter with a defect or a second printed matter without a defect as a comparison target, form a pair.

The sensory evaluation value input unit 72 is an input interface through which a user inputs a sensory evaluation value D11 obtained by comparing a pair of the first printed matter and the second printed matter.

The comparison-processing model generation unit 74 is an arithmetic unit that performs comparison-processing model generation processing P4. The comparison-processing model generation processing P4 is processing of generating a comparison-processing machine learning model D12, from the comparison-processing learning reference data D9 and the comparison-processing learning inspection data D10 as learning input information and the sensory evaluation value D11 as learning output information. That is, the comparison-processing machine learning model D12 is a model using an original data comparison method.

The comparison-processing model storage unit 76 is a memory that stores the comparison-processing machine learning model D12 generated by the comparison-processing model generation unit 74.

The generation system 64 configured as described above generates the comparison-processing machine learning model D12 as follows. That is, a user inputs the sensory evaluation value D11 of the pair of the first printed matter and the second printed matter from the sensory evaluation value input unit 72 (an example of a sensory evaluation value input step). The comparison-processing model generation unit 74 performs the comparison-processing model generation processing P4 of generating a comparison-processing machine learning model D12, from the comparison-processing learning reference data D9 and the comparison-processing learning inspection data D10 as learning input information and the sensory evaluation value D11 as learning output information (an example of a comparison-processing model generation step).

The comparison-processing model generation processing P4 is performed based on the correct answer data comparison method. Thus, it is easy to ensure accuracy of the inspection, and it is possible to generate the comparison-processing machine learning model D12 without using a machine learning method that requires a large amount of data such as deep learning.

As the comparison-processing model generation processing P4, for example, multiple regression analysis, support vector machine, or a partial least-square method may be used. Compared to deep learning, the number of data required for one-digit or two-digit order is small, and thus it is easy to collect data by sensory evaluation. On the other hand, even in a case where deep learning is used, a detection difficulty level is lower than that in the original data comparison method, and thus an amount of data can be reduced.

The comparison processing unit 26 performs the comparison processing P1 by using the comparison-processing machine learning model D12, and thus the machine learning model D5 that is properly correlated with the sensory evaluation value and using the original data comparison method can be generated by the model generation unit 44.

Fourth Embodiment

[Effective Collection Method of Learning Defect Information]

The first learning reference data D1 and the learning inspection data D2 are generated based on a captured image obtained by inputting the learning print digital data, which is an acquisition source of the second learning reference data D4, to a printing device, and capturing an image of an output printed matter by an image capturing device. On the other hand, in this case, there is randomness in whether or not a defect occurs in the learning inspection data D2, and as a result, data collection efficiency is extremely poor.

For example, in many cases, a streak-shaped defect that occurs in a single-pass ink jet printing device occurs due to curved ejection from nozzles. On the other hand, since it is difficult to intentionally cause curved ejection, it is necessary to perform printing many times until curved ejection occurs. For this reason, in a case of performing printing for acquiring the learning inspection data D2, it is preferable to intentionally process a part of the image information of the learning print digital data such that a pseudo defect is caused.

[Configuration of Printing Device and Collection of Learning Defect Information]

Figure 9:
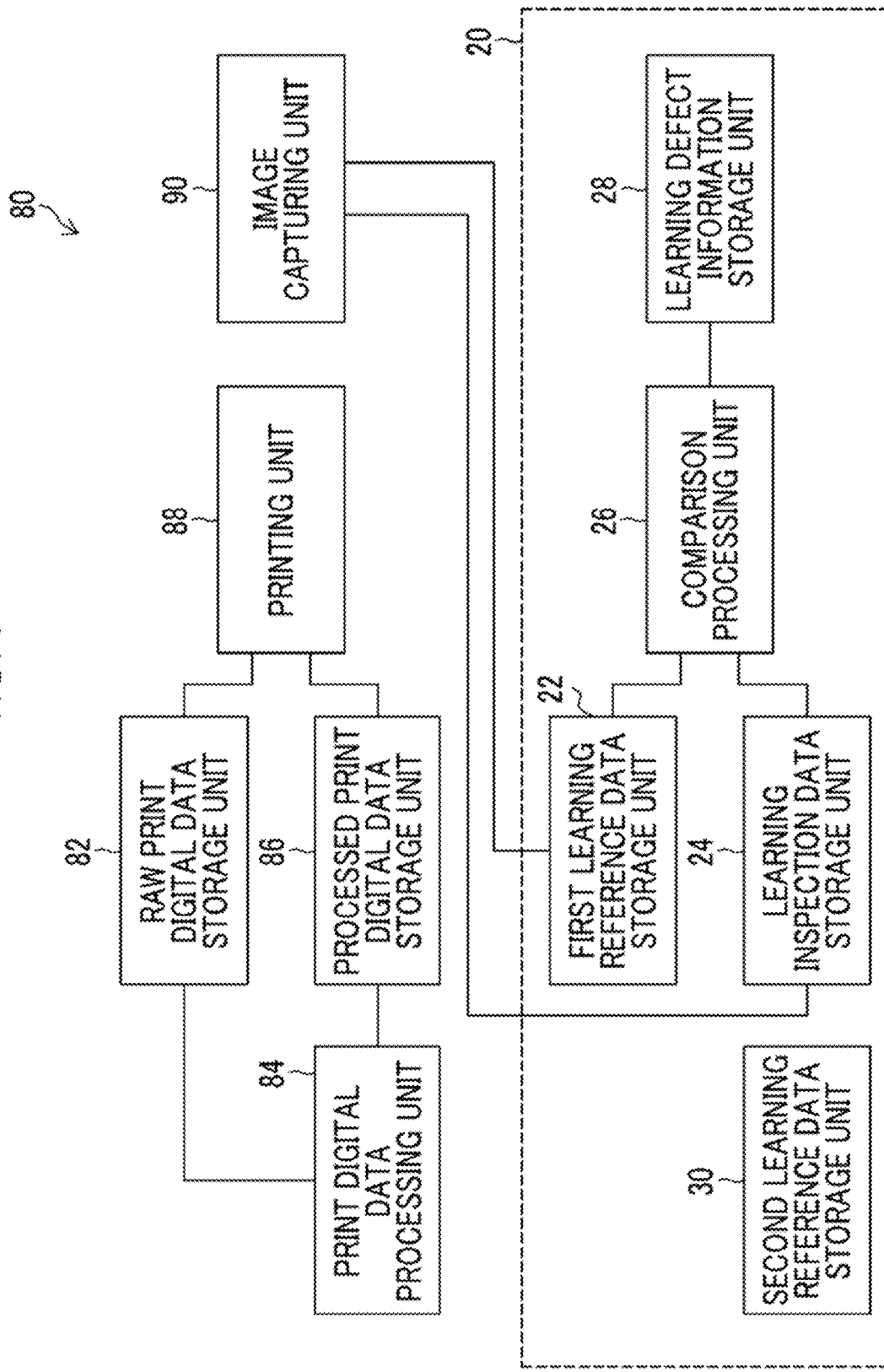
FIG. 9 is a block diagram illustrating a configuration of a printing device including a learning information generation device.
Figure 10:
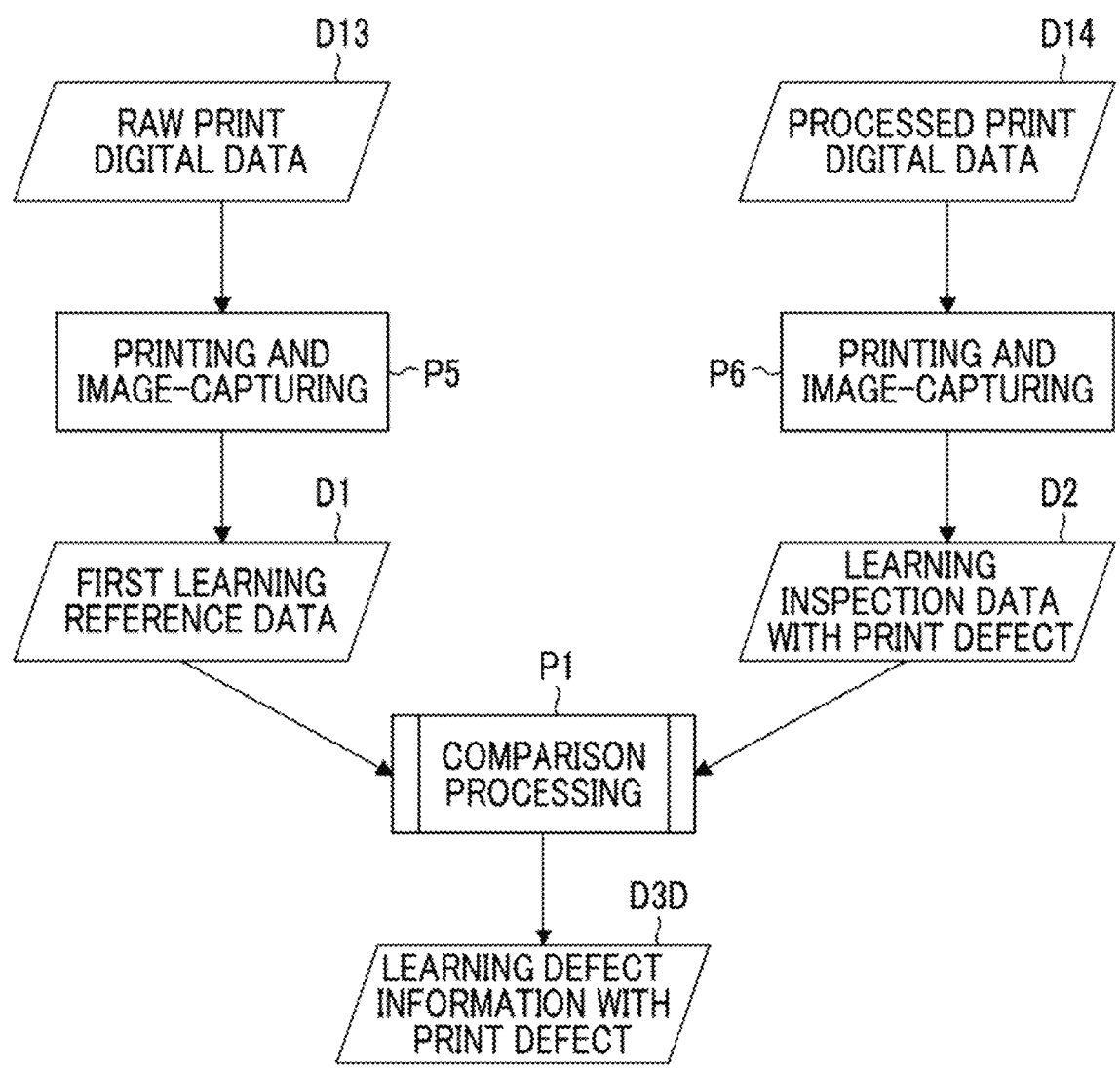
FIG. 10 is a flowchart illustrating collection of learning defect information.

FIG. 9 is a block diagram illustrating a configuration of a printing device including a learning information generation device. The same portions as those in FIG. 1 are denoted by the same reference numerals, and a detailed description thereof will be omitted. FIG. 10 is a flowchart illustrating collection of the learning defect information.

A printing device 80 includes a raw print digital data storage unit 82, a print digital data processing unit 84, a processed print digital data storage unit 86, a printing unit 88, and an image capturing unit 90, in addition to the learning information generation device 20.

The raw print digital data storage unit 82 is a memory that stores raw print digital data D13. Here, "raw" means that processing related to a pseudo defect is not performed.

The print digital data processing unit 84 is an image processing unit that intentionally processes at least a part of the image information of the raw print digital data D13 so as to cause a pseudo defect. A position, a type, and a degree of the pseudo defect to be caused may be determined by a user, or may be stored in a memory (not illustrated). The print digital data processing unit 84 generates processed print digital data D14 by reading the raw print digital data D13 from the raw print digital data storage unit 82 and performing desired processing on the raw print digital data D13.

The processed print digital data storage unit 86 is a memory that stores the processed print digital data D14. The printing device 80 may acquire the processed print digital data D14 from an external device via an interface (not illustrated).

The printing unit 88 is an image recording unit that prints an image on a recording medium based on the input print digital data. The printing unit 88 performs printing of the raw print digital data D13 and printing of the processed print digital data D14. The image capturing unit 90 is an image capturing device that captures an image of a printed matter printed by the printing unit 88.

The printing unit 88 and the image capturing unit 90 perform printing and image-capturing processing P5. The printing and image-capturing processing P5 is processing of generating the first learning reference data D1 by printing the raw print digital data D13 by the printing unit 88 and capturing an image of a printed matter by the image capturing unit 90. The printing device 80 stores the first learning reference data D1 in the first learning reference data storage unit 22.

Similarly, the printing unit 88 and the image capturing unit 90 perform printing and image-capturing processing P6. The printing and image-capturing processing P6 is processing of generating the learning inspection data D2 with a defect by printing the processed print digital data D14 by the printing unit 88 and capturing an image of a printed matter (an example of a printed matter with a defect) by the image capturing unit 90. The printing device 80 stores the learning inspection data D2 in the learning inspection data storage unit 24.

The comparison processing unit 26 performs the comparison processing P1 by using the acquired first learning reference data D1 and the acquired learning inspection data D2, and thus it is possible to easily collect the learning defect information D3 with a defect.

[Processing Method of Print Digital Data]

The printing unit 88 performs printing by ejecting inks of, for example, cyan (C), magenta (M), yellow (Y), and black (K). A case where the print digital data is a CMYK 4-channel multi-valued digital image and a pixel value of each channel is a signal representing an ejection amount of a color ink will be described as an example.

In a case of generating the print digital data D14 in which a streak-shaped defect due to an ejection failure of the black ink is expressed at a certain position, the print digital data processing unit 84 linearly decreases a pixel value of the K-channel digital image at the position, and thus the streak-shaped defect can be expressed to be brighter as compared with a case where there is no defect. Alternatively, by increasing the pixel value, the streak-shaped defect can be expressed to be darker as compared with a case where there is no defect. By changing a degree of increase or decrease of the pixel value and a range in which a defect occurs, it is also possible to express a degree of a defect and a length of a defect. Of course, instead of the black ink, in a case where a desired defect is expressed by processing channel images of cyan, magenta, and yellow inks, there is no problem.

Alternatively, a streak-shaped defect may be expressed by changing a correction amount for non-ejection correction or a degree of density of non-ejection nozzles. The ink jet printing has a function of compensating drawing at a non-ejection position by setting a defective nozzle as a non-ejection nozzle and controlling an ejection amount of an adjacent nozzle (in many cases, increasing an ejection amount of an adjacent nozzle). On the other hand, in a case where a correction amount of the adjacent nozzle is not optimized, a streak-shaped defect may occur due to insufficient correction or overcorrection. Based on this fact, by setting a certain nozzle as a non-ejection nozzle and performing non-ejection correction which is not optimal, it is possible to express a streak-shaped defect. Further, in a case where the non-ejection nozzles are densely located and the adjacent nozzle cannot perform correction, a streak-shaped defect occurs. Based on this fact, by setting a certain nozzle and adjacent nozzles as non-ejection nozzles and densely locating the non-ejection nozzles, it is possible to express a streak-shaped defect. It can be said that changing of the correction amount of the non-ejection correction and the degree of density of the non-ejection nozzles means controlling of the image data (intermediate image data) to be used in the printing machine after all. Thus, the image data is included in an example of the processed print digital data D14.

In a case of generating the print digital data D14 in which a spot-shaped defect due to ink dripping of the cyan ink is expressed at a certain position, the print digital data processing unit 84 increases a pixel value of the C-channel digital image at the position in a circular form, and thus ink dripping of the cyan ink can be expressed. By changing a degree of increase or decrease of the pixel value and a range in which a defect occurs, it is also possible to express a degree of a defect and a size of a defect. Of course, instead of the black ink, in a case where a desired defect is expressed by processing channel images of cyan, magenta, and yellow inks, there is no problem.

In a case where the raw print digital data D13 is a binary digital image having a value of 0 or 1 after halftone processing, instead of increasing or decreasing the pixel value, by increasing or decreasing an appearance frequency of a value of 0 or 1 at a desired position, it is possible to express a defect.

By performing the printing and image-capturing processing P6 on the processed print digital data D14, it is possible to generate the learning inspection data D2 with a defect. On the other hand, in order to acquire the first learning reference data D1 paired with the learning inspection data D2, as in the example, the printing and image-capturing processing P5 may be performed on the raw print digital data D13.

Fifth Embodiment

[Printing Device for Generation of Machine Learning Model]

In the printing device, various paper brands are used as a recording medium. Further, depending on paper brands, characteristics of a print image to be printed are changed. For example, in a case of an ink jet printing device, permeability of an ink varies depending on paper, and as a result, reproduction density changes or a dot size of an ink on paper changes. The changes affect a structure of the image.

In machine learning, as a model is used in a state closer to a condition used in model learning, higher estimation accuracy can be obtained. For example, rather than in a case where a model generated using gloss paper A is applied to matte paper B, in a case where a model generated using matte paper B is applied to matte paper B or in a case where a model generated using both of gloss paper A and matte paper B is applied to matte paper B, higher estimation accuracy can be obtained.

On the other hand, it is difficult to generate a model in advance using all paper to be used by customers of a printing machine. For this reason, in an ink jet printing device and in a so-called digital printing machine which prints an electronic photograph or the like, for which it is preferable to generate a model according to a use condition at a use place of a customer, a printing plate is not required and registered print digital data can be immediately printed. Thus, by registering, in the printing machine, in advance, various print digital data and print digital data in which a defect is expressed by processing a part of the print digital data, a model can be easily generated at a use place.

[Configuration of Printing Device and Generation of Machine Learning Model]

Figure 11:
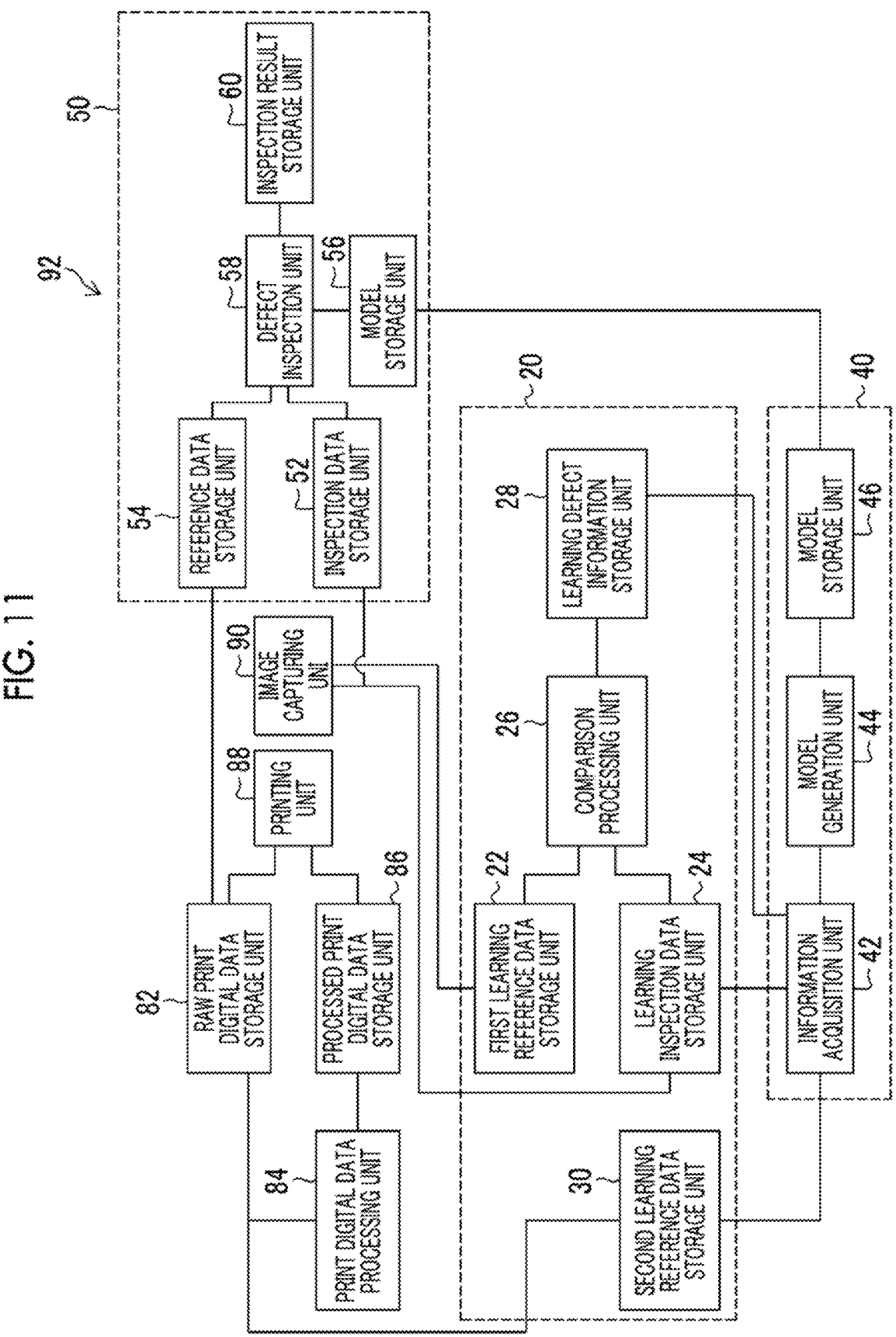
FIG. 11 is a block diagram illustrating a configuration of a printing device that generates and updates a machine learning model.
Figure 12:
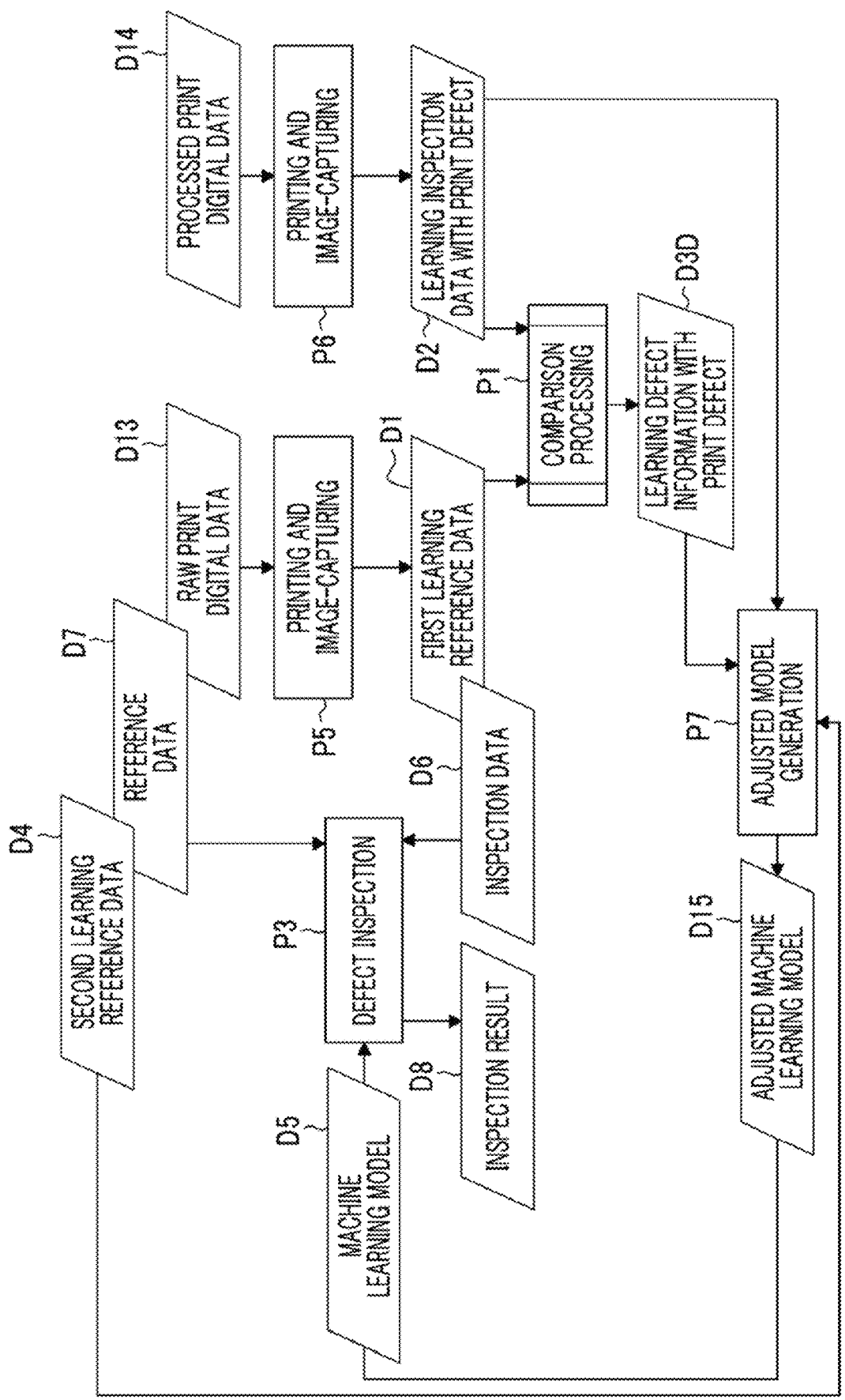
FIG. 12 is a flowchart illustrating generation and update of a machine learning model.

FIG. 11 is a block diagram illustrating a configuration of a printing device that generates a machine learning model. FIG. 12 is a flowchart illustrating generation of a machine learning model.

A printing device 92 includes a learning information generation device 20, a model generation device 40, a printed-matter inspection device 50, a raw print digital data storage unit 82, a print digital data processing unit 84, a processed print digital data storage unit 86, a printing unit 88, and an image capturing unit 90.

The printing device 92 stores raw print digital data D13 in the raw print digital data storage unit 82. The printing unit 88 and the image capturing unit 90 generate the first learning reference data D1 by performing printing and image-capturing processing P5 on the raw print digital data D13. The first learning reference data D1 is stored in the first learning reference data storage unit 22.

The print digital data processing unit 84 generates processed print digital data D14 by reading the raw print digital data D13 from the raw print digital data storage unit 82 and performing desired processing on the raw print digital data D13. The processed print digital data D14 is stored in the processed print digital data storage unit 86.

The printing unit 88 and the image capturing unit 90 generate the learning inspection data D2 by performing printing and image-capturing processing P6 on the processed print digital data D14. The learning inspection data D2 is stored in the learning inspection data storage unit 24.

The comparison processing unit 26 acquires learning defect information D3D with a defect by performing comparison processing P1 on the first learning reference data D1 and the learning inspection data D2. The learning defect information D3D with a defect is stored in the learning defect information storage unit 28.

The print digital data processing unit 84 generates print digital data D14 in which various pseudo defects are caused. By repeating the same processing, it is possible to collect a large number of the learning defect information D3D with a defect.

The second learning reference data storage unit 30 stores the second learning reference data D4 which is the same as the raw print digital data D13. The second learning reference data storage unit 30 and the raw print digital data storage unit 82 may be shared.

The information acquisition unit 42 acquires, as learning input information, the learning inspection data D2 and the second learning reference data D4, and acquires, as learning output information, the learning defect information D3D with a defect.

Further, the printing unit 88 and the image capturing unit 90 generate the learning inspection data D2 by performing printing and image-capturing processing P6 on the raw print digital data D13, and the learning inspection data D2 is stored in the learning inspection data storage unit. 24. The comparison processing unit 26 acquires the learning defect information D3N without a defect by performing the comparison processing P1 on the first learning reference data D1 and the learning inspection data D2. In a case where a defect accidentally occurs during printing, it is noted that the learning defect information D3D with a defect is acquired in the comparison processing P1. Alternatively, the information acquisition unit 42 acquires, as the learning input information without a defect, the first learning reference data D1 based on the raw print digital data D13, and acquires, as the learning output information without a defect, the learning defect information D3N without a defect. As a method of acquiring the learning defect information D3N, any one of the methods may be used, or both of the methods may be used in combination.

The model generation unit 44 performs adjusted model generation processing P7 of generating an adjusted machine learning model D15 using the original data comparison method, from the learning inspection data D2 (in a case of the learning inspection data D2 without a defect, the first learning reference data D1 may be used) and the second learning reference data D4 as the learning input information and the learning defect information D3D with a defect as the learning output information. The adjusted machine learning model D15 is stored in the model storage unit 46. Here, "adjustment" indicates that adjustment is performed for a specific customer.

The adjusted model generation processing P7 may be performed using only the learning input information and the learning output information acquired or generated in a use place (adjusted model generation method A), or may be performed using a combination of the learning input information and the learning output information, which are used in a case where the existing machine learning model D5 is created, and the learning input information and the learning output information, which are acquired or generated in a use place (adjusted model generation method B). Alternatively, the existing machine learning model may be updated using a technique such as mini-batch learning or online learning based on the learning input information and the learning output information acquired or generated in a use place (adjusted model generation method C). In this way, the adjusted machine learning model D15 is generated.

In a case where the adjusted model generation method A is used, there is an advantage that a model specialized for a use condition of a customer can be generated. Further, in a case where the adjusted model generation method B or the adjusted model generation method C is used, there is an advantage that performance of the generated machine learning model D5 is easily stabilized because an amount of the learning data is large.

The feature of the fifth embodiment is to generate a machine learning model for the original data comparison method, which is adjusted for a specific customer, by using the correct answer data comparison method (comparison processing P1). In the correct answer data comparison method, defect inspection is performed based on the print image printed on paper of the same brand, and thus the inspection can be accurately performed regardless of types of the used paper brands. On the other hand, in the original data comparison method, comparison with the print digital data is performed, and as a result, in a case where the machine learning model is not adjusted for a customer, the inspection accuracy tends to decrease. Therefore, as in the present embodiment, by generating a machine learning model for the original data comparison method, which is adjusted for the paper brand used by a customer, by using the correct answer data comparison method, the inspection accuracy can be greatly improved.

The fifth embodiment has been described focusing on the paper used by a customer On the other hand, even in a case where the paper is the same as the paper used for generation of the original machine learning model, "adjustment of the machine learning model" according to the present embodiment is useful. For example, the adjustment of the machine learning model is useful even in a case where a customer independently changes a configuration (an ink type, an ink ejection condition, a drying condition) related to printing. Further, even in a case where a configuration is not changed, "adjustment" can be performed according to various variations (individual differences) of the printing machine itself.

[Defect Inspection of Printed Matter]

In the printing device 92, the print digital data for a printed matter to be output is stored in the raw print digital data storage unit 82, as the raw print digital data D13. The printing unit 88 prints the raw print digital data D13. The image capturing unit 90 captures an image of the printed matter, and stores the captured image in the inspection data storage unit 52, as inspection data D6.

Further, in the reference data storage unit 54, the print digital data for the printed matter to be output, which is the same as the raw print digital data D13, is stored as reference data D7. The reference data storage unit 54 and the raw print digital data storage unit 82 may be shared.

The defect inspection unit 58 performs defect inspection processing P3 of inspecting a defect of a printed matter by applying the inspection data D6 and the reference data D7, which are input, to the machine learning model D5 and acquiring an inspection result D8. The acquired inspection result D8 is stored in the inspection result storage unit 60.

Here, since the machine learning model D5 is updated by the adjusted machine learning model D15, it is possible to perform the defect inspection according to the use condition of a customer. For example, by generating the adjusted machine learning model D15 based on the printed matter obtained by performing printing on a paper brand used by a customer and updating the machine learning model D5, it is possible to perform the defect inspection suitable for the paper brand.

In this way, in a state where the printing device 92 includes both of the learning information generation device 20 having an inspection function using the correct answer data comparison method and the printed-matter inspection device 50 having an inspection function using the original data comparison method, by providing a function of generating or updating a machine learning model using the original data comparison method based on an inspection result obtained by performing inspection using the correct answer data comparison method by a customer at a use place, the adjusted machine learning model D15 using the original data comparison method, which is suitable for a use condition of the customer, can be acquired at the use place.

In the present embodiment, arithmetic operations for the adjusted model generation processing P7 are performed in the printing device 92. On the other hand, the arithmetic operations may be performed in a computer connected to the printing device 92 or in a cloud environment connected to a network.

Sixth Embodiment

An example in which an ink jet printing device is applied as the printing device 92 will be described.

[Configuration of Ink Jet Printing Device]

Figure 13:
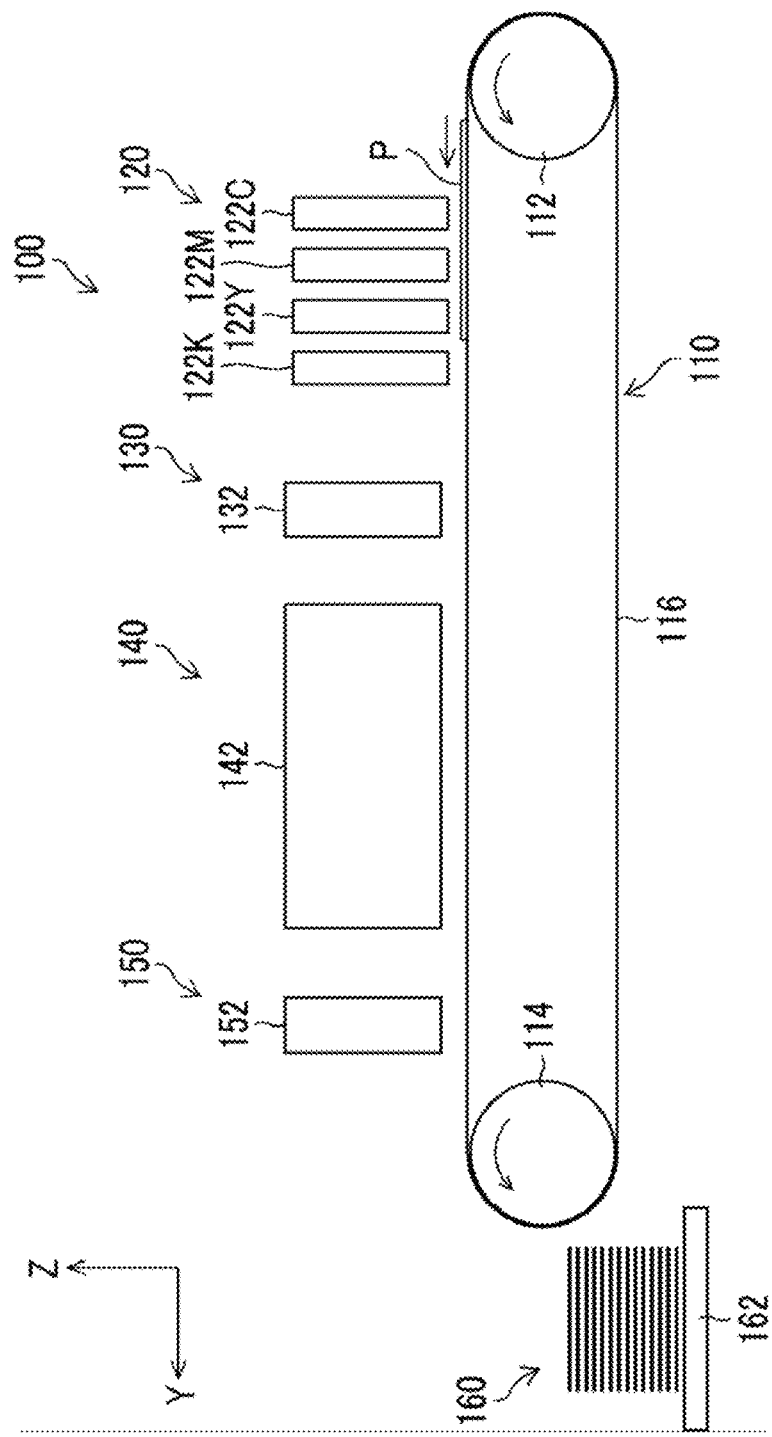
FIG. 13 is a block diagram illustrating a configuration of a printing device that generates and updates a machine learning model.

FIG. 13 is an overall configuration diagram illustrating a schematic overall configuration of an ink jet printing device 100. As illustrated in FIG. 13, the ink jet printing device 100 is a printing machine that prints a color image by ejecting four color inks of cyan (C), magenta (M), yellow (Y), and black (K) onto a sheet of paper P which is a print medium.

As the paper P, general-purpose printing paper is used. The general-purpose printing paper is not so-called paper for ink jet exclusive use but paper including cellulose as a main component, such as coated paper used for general offset printing. As the ink, an aqueous ink is used. The aqueous ink is an ink in which a coloring material such as a dye or a pigment is dissolved or dispersed in water or a water-soluble solvent.

As illustrated in FIG. 13, the ink jet printing device 100 includes a transport unit 110, a printing unit 120, an image capturing unit 130, a drying unit 140, a sorting unit 150, and a paper discharge unit 160.

[Transport Unit]

The transport unit 110 transports paper P supplied from a paper supply unit (not illustrated) in a transport direction (Y direction). The transport unit 110 includes an upstream pulley 112, a downstream pulley 114, and a transport belt 116.

The upstream pulley 112 includes a rotation shaft (not illustrated) extending in a horizontal direction, and the rotation shaft is rotatably and pivotally supported. The downstream pulley 114 includes a rotation shaft (not illustrated) parallel to the rotation shaft of the upstream pulley 112, and the rotation shaft is rotatably and pivotally supported.

The transport belt 116 is an endless belt made of stainless steel. The transport belt 116 is bridged between the upstream pulley 112 and the downstream pulley 114. By using the transport belt 116 made of stainless steel, flatness of the paper P can be kept good.

The downstream pulley 114 includes a motor (not illustrated) as a driving unit. In a case where the motor is driven, the downstream pulley 114 rotates counterclockwise in FIG. 13. The upstream pulley 112 is driven by the rotation of the downstream pulley 114, and rotates counterclockwise in FIG. 13. By the rotation of the upstream pulley 112 and the downstream pulley 114, the transport belt 116 travels between the upstream pulley 112 and the downstream pulley 114 along a travel route.

The paper P supplied from a paper supply unit (not illustrated) is placed on a transport surface of the transport belt 116. The transport unit 110 transports the paper P placed on the transport belt 116 along a transport path from the upstream pulley 112 to the downstream pulley 114, and delivers the paper P to the paper discharge unit 160. At a position on the transport path that faces the printing unit 120, the image capturing unit 130, the drying unit 140, and the sorting unit 150, the paper P is transported in a state where the print surface is horizontally maintained.

By providing a plurality of suction holes (not illustrated) on the transport belt 116 and sucking the suction holes of the transport belt 116 by a pump (not illustrated), the paper P placed on the transport surface of the transport belt 116 may be sucked and maintained on the transport surface.

[Printing Unit]

The printing unit 120 forms (prints) an image on the paper P. The printing unit 120 includes ink jet heads 122C, 122M, 122Y, and 122K. The ink jet head 122C ejects cyan ink droplets by an ink jet method. Similarly, the ink jet heads 122M, 122Y, and 122K respectively eject magenta, yellow, and black ink droplets by the ink jet method.

The ink jet heads 122C, 122M, 122Y, and 122K are disposed at regular intervals along the transport path of the paper P by the transport belt 116. Each of the ink jet heads 122C, 122M, 122Y, and 122K is configured with a line head, and has a length corresponding to a maximum paper width. The ink jet heads 122C, 122M, 122Y, and 122K are disposed such that a nozzle surface (a surface on which the nozzles are arranged) faces the transport belt 116.

The ink jet heads 122C, 122M, 122Y, and 122K form an image on the print surface of the paper P by ejecting ink droplets from the nozzles formed on the nozzle surface toward the paper P transported by the transport belt 116.

In this way, the printing unit 120 generates a printed matter by scanning the paper P transported by the transport belt 116 once, that is, by a so-called single-pass method. The printing unit 120 may be common to the printing unit 88.

[Image Capturing Unit]

The image capturing unit 130 may be common to the image capturing unit 90. The image capturing unit 130 acquires an image on the print surface of the paper P. The image capturing unit 130 is disposed on the downstream side of the printing unit 120 with respect to the transport direction of the paper P. The image capturing unit 130 includes a scanner 132.

The scanner 132 is a device that optically reads an image, which is formed on the paper P by using the ink jet heads 122C, 122M, 122Y, and 122K, and generates image data indicating the read image. The scanner 132 includes an imaging device that images an image printed on the paper P and converts the image into an electric signal. As the imaging device, a color charge coupled device (CCD) linear image sensor may be used. Instead of the color CCD linear image sensor, a color complementary metal oxide semiconductor (CMOS) linear image sensor may be used.

The scanner 132 may include, in addition to the imaging device, an illumination optical system that illuminates a reading target and a signal processing circuit that generates digital image data by processing a signal obtained from the imaging device.

[Drying Unit]

The drying unit 140 dries the ink on the paper P. The drying unit 140 is disposed on the downstream side of the image capturing unit 130 with respect to the transport direction of the paper P.

The drying unit 140 includes a heater 142. As the heater 142, for example, at least one of a halogen heater or an infrared heater is used. The heater 142 dries the ink on the paper P by heating the print surface of the paper P. The drying unit 140 may include a blowing unit such as a fan or a blower.

[Sorting Unit]

The sorting unit 150 sorts a printed matter according to quality determination on the paper P transported by the transport belt 116. The sorting unit 150 is disposed on the downstream side of the drying unit 140 with respect to the transport direction of the paper P. The sorting unit 150 includes a stamper 152.

The stamper 152 performs stamping processing of applying an ink onto a leading edge of the paper P that is determined as a defective printed matter according to the quality determination on the paper P transported by the transport belt 116.

[Paper Discharge Unit]

The paper discharge unit 160 collects the dried paper P (printed matter) on which an image is formed. The paper discharge unit 160 is disposed on the downstream side of the sorting unit 150 with respect to the transport direction of the paper P and at the end point of the transport path of the transport unit 110. The paper discharge unit 160 includes a paper discharge tray 162.

The paper discharge tray 162 stacks and collects the paper P transported by the transport belt 116. The paper discharge tray 162 includes a front paper pad, a rear paper pad, and a horizontal paper pad (not illustrated), and thus the paper P is stacked in an orderly manner.

Further, the paper discharge tray 162 is provided so as to be able to move up and down by a lifting device (not illustrated). The driving of the lifting device is controlled in association with an increase or a decrease of the paper P stacked on the paper discharge tray 162. Thereby, the paper P located at the highest position among the paper P stacked on the paper discharge tray 162 always has a constant height.

[Control System of Ink Jet Printing Device]

Figure 14:
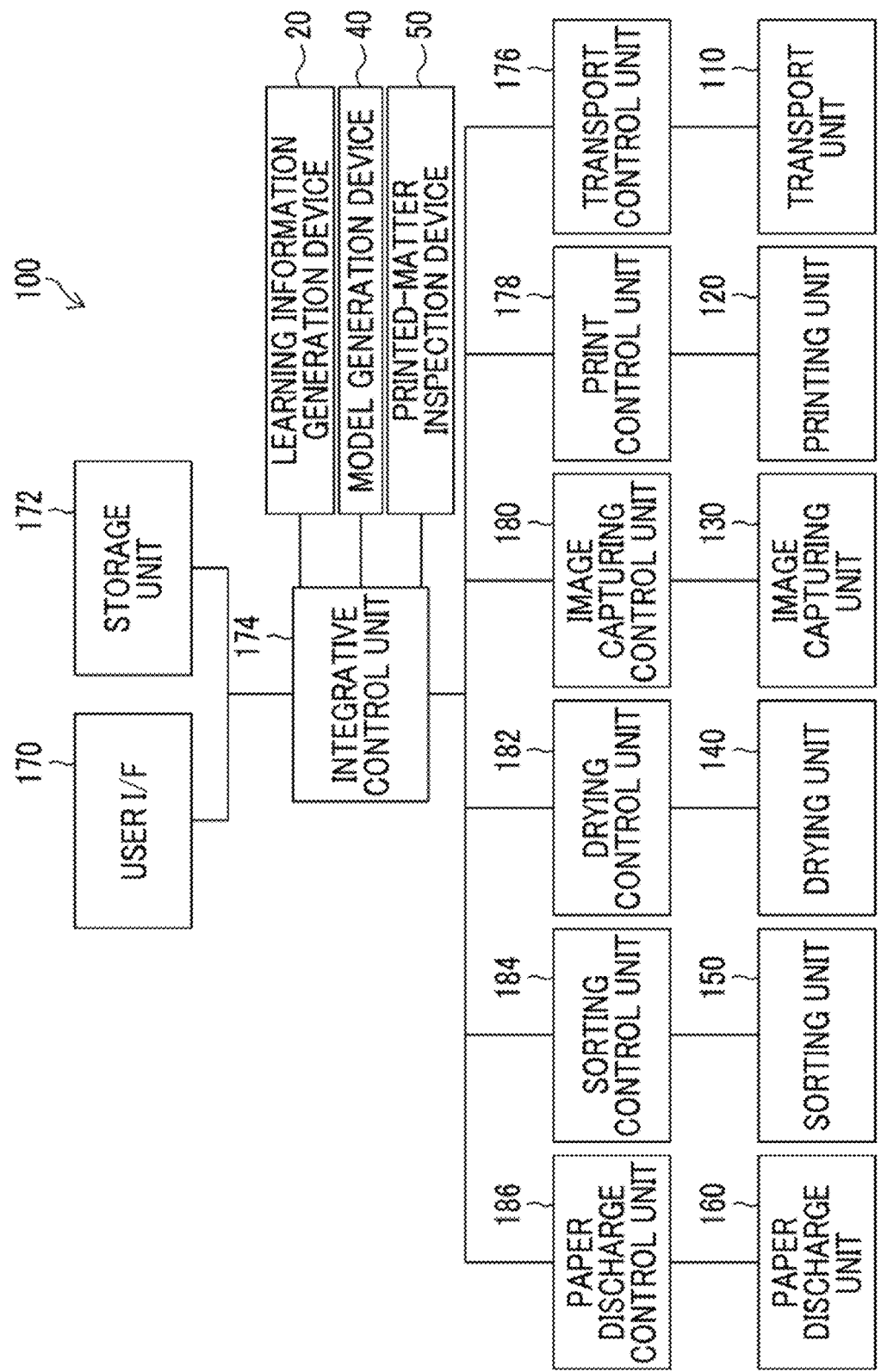
FIG. 14 is a block diagram illustrating an internal configuration of an ink jet printing device.

FIG. 14 is a block diagram illustrating an internal configuration of an ink jet printing device 100. The ink jet printing device 100 includes, in addition to the learning information generation device 20, the model generation device 40, the printed-matter inspection device 50, the transport unit 110, the printing unit 120, the image capturing unit 130, the drying unit 140, the sorting unit 150, and the paper discharge unit 160, a user interface 170, a storage unit 172, an integrative control unit 174, a transport control unit 176, a print control unit 178, an image capturing control unit 180, a drying control unit 182, a sorting control unit 184, and a paper discharge control unit 186.

The user interface 170 includes an input unit (not illustrated) and a display unit (not illustrated) that allow the user to operate the ink jet printing device 100. The input unit is, for example, an operation panel that receives an input from a user. The display unit is, for example, a display that displays image data and various information. The user can cause the ink jet printing device 100 to print a desired image by operating the user interface 170.

The storage unit 172 stores a program for controlling the ink jet printing device 100 and information required for executing the program. The storage unit 172 is configured with a hard disk (not illustrated) or a non-transitory recording medium such as various semiconductor memories. A volatile memory such as a random access memory (RAM) (not illustrated) that temporarily stores the first learning reference data D1, the learning inspection data D2, the learning defect information D3, the second learning reference data D4, the machine learning model D5, and the like may be used. The storage unit 172 also serves as the raw print digital data storage unit 82 and the processed print digital data storage unit 86.

The integrative control unit 174 performs various processing according to the program stored in the storage unit 172, and performs integrative control of the overall operation of the ink jet printing device 100. The integrative control unit 174 also performs integrative control of the learning information generation device 20, the model generation device 40, and the printed-matter inspection device 50. The integrative control unit 174 also serves as the print digital data processing unit 84.

The transport control unit 176 causes the transport unit 110 to transport the paper P in the transport direction by controlling a motor (not illustrated) of the transport unit 110. Thereby, the paper P supplied from a paper supply unit (not illustrated) passes through positions facing the printing unit 120, the image capturing unit 130, the drying unit 140, and the sorting unit 150, and is finally discharged to the paper discharge unit 160.

The print control unit 178 controls ejection of inks by the ink jet heads 122C, 122M, 122Y, and 122K. The print control unit 178 causes the ink jet heads 122C, 122M, 122Y, and 122K to eject cyan, magenta, yellow, and black ink droplets onto the paper P at timings at which the paper P passes through positions facing each nozzle surface. Thereby, a color image is formed on the print surface of the paper P, and thus the paper P becomes a "printed matter".

The image capturing control unit 180 causes the image capturing unit 130 to read the image of the paper P (printed matter) by controlling imaging by the scanner 132. The image capturing control unit 180 causes the scanner 132 to read the image formed on the paper P at a timing at which the paper P passes through a position facing the scanner 132. Thereby, the inspection image is acquired.

The drying control unit 182 causes the drying unit 140 to dry the paper P by controlling heating by the heater 142. The drying control unit 182 causes the heater 142 to heat the paper P in a case where the paper P passes through a position facing the heater 142.

The sorting control unit 184 causes the sorting unit 150 to sort the paper P by controlling stamping processing by the stamper 152. The sorting control unit 184 (an example of an output unit that outputs a detection result of a defect of a printed matter) classifies the printed matter into a non-defective printed matter and a defective printed matter according to the detected defect. In a case where the paper P passing through a position facing the stamper 152 is the paper P determined as a defective printed matter, the sorting control unit 184 performs stamp processing by the stamper 152.

The paper discharge control unit 186 controls stacking of the paper P by the paper discharge tray 162. The paper P is discharged onto the paper discharge tray 162, and is stacked. An ink is applied on the leading edge of the paper P as a defective printed matter. Therefore, a user can specify the defective printed matter among the paper P stacked on the paper discharge tray 162.

Figure 15:
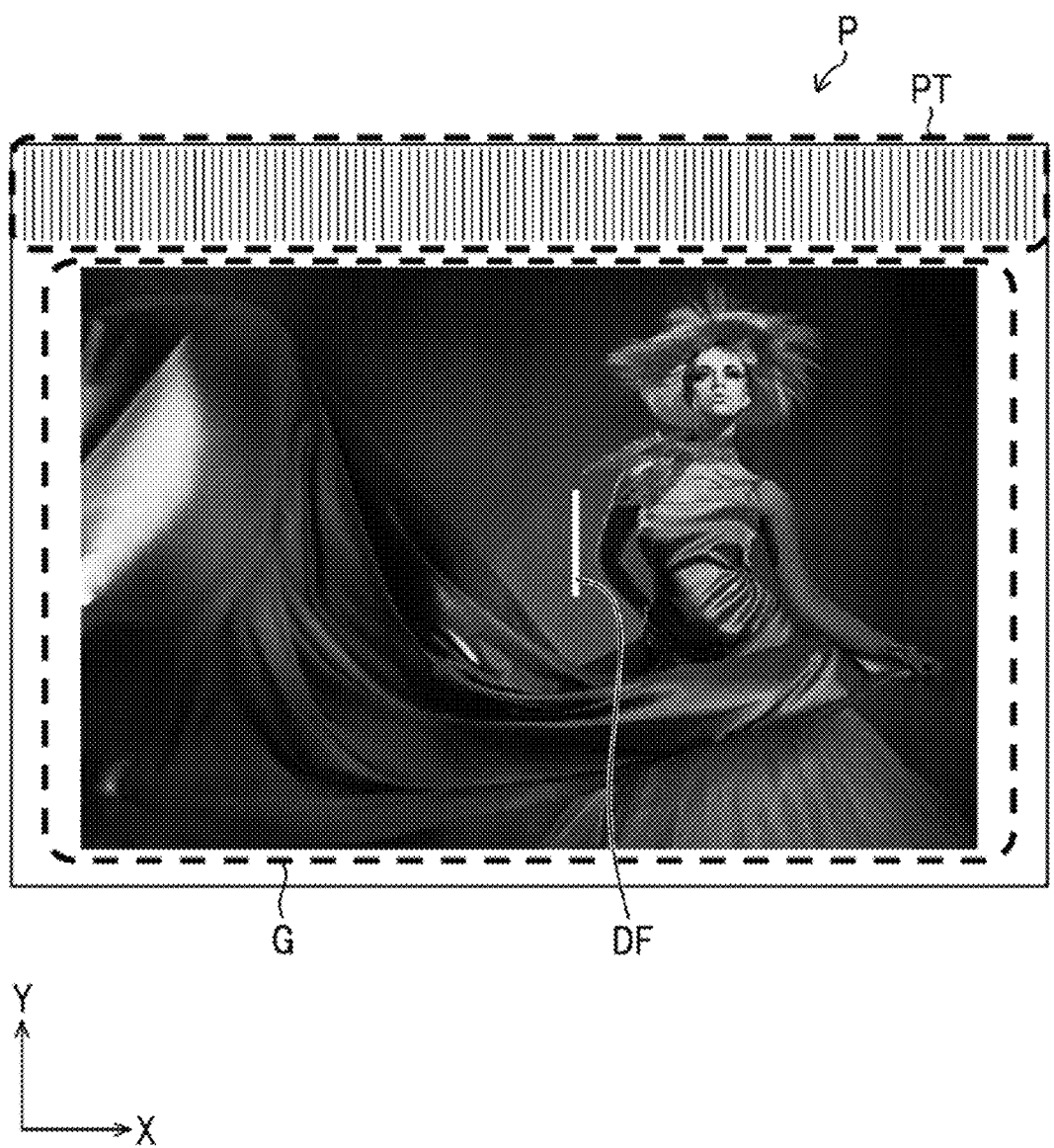
FIG. 15 is a diagram illustrating an example of a printed matter which is printed by an ink jet printing device.

FIG. 15 is a diagram illustrating an example of a printed matter which is printed by an ink jet printing device 100. As illustrated in FIG. 15, a defective nozzle detection pattern PT and an image G are printed on the paper P as a printed matter.

The defective nozzle detection pattern PT includes lines that are spaced at regular intervals in an X direction and are extended along a Y direction. By printing a plurality of defective nozzle detection patterns PT by shifting the nozzles forming the lines one by one, it is possible to detect defects of all the nozzles.

The image G is a print result which is printed based on the print digital data. The printed-matter inspection device 50 detects a defect of the image G. The image G illustrated in FIG. 15 has a streak-shaped defect DF extending in the Y direction. Examples of the streak-shaped defect include not only continuous streak-shaped defects but also intermittent streak-shaped defects. The defect DF occurs because the nozzle that ejects an ink onto a position of the defect DF is defective in ejection. The defective ejection nozzle may be detected by using the defective nozzle detection pattern PT. In the ink jet printing device 100, the printed matter is classified into a non-defective printed matter and a defective printed matter according to the defect detected by the printed-matter inspection device 50.

Others

The machine learning model generation method and the inspection method may be realized as a program for causing a computer to execute each step, and a non-transitory recording medium such as a compact disk-read only memory (CD-ROM) that stores the program may be configured.

In the embodiments described above, for example, as a hardware structure of a processing unit that executes various processing such as processing in the learning information generation device 20, the model generation device 40, and the printed-matter inspection device 50, the following various processors may be used. The various processors include, as described above, a CPU, which is a general-purpose processor that functions as various processing units by executing software (program), and a dedicated electric circuit, which is a processor having a circuit configuration specifically designed to execute a specific process, such as a programmable logic device (PLD) or an application specific integrated circuit (ASIC) that is a processor of which the circuit configuration may be changed after manufacturing such as a graphics processing unit (GPU) or a field programmable gate array (FPGA), which is a processor specialized for image processing.

One processing unit may be configured by one of these various processors, or may be configured by a combination of two or more processors of the same type or different types (for example, a combination of a plurality of FPGAs, a combination of a CPU and an FPGA, or a combination of a CPU and a GPU). Further, the plurality of processing units may be configured by one processor. As an example in which the plurality of processing units are configured by one processor, firstly, as represented by a computer such as a client and a server, a form in which one processor is configured by a combination of one or more CPUs and software and the processor functions as the plurality of processing units may be used. Secondly, as represented by a system on chip (SoC) or the like, a form in which a processor that realizes the function of the entire system including the plurality of processing units by one integrated circuit (IC) chip is used may be used. As described above, the various processing units are configured by using one or more various processors as a hardware structure.

Further, as the hardware structure of the various processors, more specifically, an electric circuit (circuitry) in which circuit elements such as semiconductor elements are combined may be used.

The technical scope of the present disclosure is not limited to the scope described in the above embodiments. The configurations and the like in the embodiments may be appropriately combined with each other without departing from the spirit of the present disclosure.

EXPLANATION OF REFERENCES

10: generation system
20: learning information generation device
22: first learning reference data storage unit
24: learning inspection data storage unit
26: comparison processing unit
28: learning defect information storage unit
30: second learning reference data storage unit
40: model generation device
42: information acquisition unit
44: model generation unit
46: model storage unit
50: printed-matter inspection device
52: inspection data storage unit
54: reference data storage unit
56: model storage unit
58: defect inspection unit
60: inspection result storage unit
62: generation system
64: generation system
66: comparison-processing model generation device
68: comparison-processing learning reference data storage unit
70: comparison-processing learning inspection data storage unit
72: sensory evaluation value input unit
74: comparison-processing model generation unit
76: comparison-processing model storage unit
80: printing device
82: raw print digital data storage unit
84: print digital data processing unit
86: processed print digital data storage unit
88: printing unit
90: image capturing unit
92: printing device
100: ink jet printing device
110: transport unit
112: upstream pulley
114: downstream pulley
116: transport belt
120: printing unit
122C: ink jet head
122K: ink jet head
122M: ink jet head
122Y: ink jet head
130: image capturing unit
132: scanner
140: drying unit 142: heater
150: sorting unit
152: stamper
160: paper discharge unit
162: paper discharge tray
170: user interface
172: storage unit
174: integrative control unit
176: transport control unit
178: print control unit
180: image capturing control unit
182: drying control unit
184: sorting control unit
186: paper discharge control unit
D1: first learning reference data
D2: learning inspection data
D3: learning defect information
D3D: learning defect information with defect
D3N: learning defect information without defect
D4: second learning reference data
D5: machine learning model
D6: inspection data
D7: reference data
D8: inspection result
D9: comparison-processing learning reference data
D10: comparison-processing learning inspection data
D11: sensory evaluation value
D12: comparison-processing machine learning model
D13: raw print digital data
D14: processed print digital data
D15: adjusted machine learning model
P: paper
P1: comparison processing
P2: model generation processing
P3: defect inspection processing
P4: comparison-processing model generation processing
P5: printing and image-capturing processing
P6: printing and image-capturing processing
P7: adjusted model generation processing

What is claimed is:

1. A machine learning model generation method for detecting a defect of a printed matter by comparing, using a machine learning model, inspection data which is acquired based on a captured image obtained by capturing an image of the printed matter and reference data which is acquired based on print digital data, the method comprising:
an acquisition step of acquiring learning inspection data that is based on a captured image obtained by capturing an image of a printed matter as an inspection target which is printed based on learning print digital data, learning defect information of the learning inspection data that is estimated by performing comparison processing of first learning reference data and the learning inspection data, the first learning reference data being based on a captured image obtained by capturing an image of a printed matter as a reference which is printed based on the learning print digital data, and second learning reference data based on the learning print digital data; and
a generation step of generating the machine learning model by using at least the learning inspection data and the second learning reference data as learning input information and using at least the learning defect information as learning output information.

2. The machine learning model generation method according to claim 1,
wherein the learning defect information includes a discrete value, and
in the generation step, the machine learning model for performing classification is generated.

3. The machine learning model generation method according to claim 2,
wherein the discrete value is a binary discrete value indicating the presence or absence of the defect of the printed matter.

4. The machine learning model generation method according to claim 2,
wherein the discrete value is a ternary or higher discrete value indicating a degree of the defect of the printed matter.

5. The machine learning model generation method according to claim 1,
wherein the learning defect information includes a continuous value, and
in the generation step, the machine learning model for performing regression is generated.

6. The machine learning model generation method according to claim 1,
wherein the learning defect information includes position information of the defect of the printed matter.

7. The machine learning model generation method according to claim 1,
wherein, in the generation step, the machine learning model is generated by deep learning.

8. The machine learning model generation method according to claim 1,
wherein, in the generation step, the machine learning model is generated by using at least the first learning reference data and the second learning reference data as learning input information and using at least the learning defect information indicating that a defect does not exist as learning output information.

9. The machine learning model generation method according to claim 1,
wherein, in the acquisition step, at least the learning inspection data is acquired, the learning inspection data being obtained by capturing an image of a printed matter printed based on processed print digital data in which a defect is expressed by processing at least a part of the learning print digital data.

10. The machine learning model generation method according to claim 1,
wherein, in the acquisition step, the first learning reference data is acquired, and
the method further comprises a comparison processing step of estimating the learning defect information of the learning inspection data by performing comparison processing of the learning inspection data and the first learning reference data.

11. The machine learning model generation method according to claim 10,
wherein, in the comparison processing step, comparison processing is performed by using a comparison-processing machine learning model.

12. The machine learning model generation method according to claim 11, further comprising:
a sensory evaluation value input step of inputting a sensory evaluation value obtained by comparing a first printed matter as a reference which is printed based on the learning print digital data and a second printed matter as a comparison target which is printed based on the learning print digital data; and a comparison-processing model generation step of generating the comparison-processing machine learning model by using comparison-processing learning reference data obtained by capturing an image of the first printed matter and comparison-processing learning inspection data obtained by capturing an image of the second printed matter as learning input information and using the sensory evaluation value as learning output information.

13. An inspection method comprising:
a defect inspection step of acquiring inspection data based on a captured image obtained by capturing an image of a printed matter as an inspection target which is printed based on print digital data and reference data based on the print digital data and detecting a defect of the printed matter as the inspection target by comparing the inspection data and the reference data by using the machine learning model generated by the machine learning model generation method according to claim 1.

14. A machine learning model generation device for detecting a defect of a printed matter by comparing, using a machine learning model, inspection data which is acquired based on a captured image obtained by capturing an image of the printed matter and reference data which is acquired based on print digital data, the device comprising:
an acquisition unit that acquires learning inspection data that is based on a captured image obtained by capturing an image of a printed matter as an inspection target which is printed based on learning print digital data, learning defect information of the learning inspection data that is estimated by performing comparison processing of first learning reference data and the learning inspection data, the first learning reference data being based on a captured image obtained by capturing an image of a printed matter as a reference which is printed based on the learning print digital data, and second learning reference data based on the learning print digital data; and
a generation unit that generates the machine learning model by using at least the learning inspection data and the second learning reference data as learning input information and using at least the learning defect information as learning output information.

15. An inspection device comprising:
the machine learning model generation device according to claim 14; and
a defect inspection unit that acquires inspection data based on a captured image obtained by capturing an image of a printed matter as an inspection target which is printed based on print digital data and reference data based on the print digital data and detects a defect of the printed matter as the inspection target by comparing the inspection data and the reference data by using a machine learning model generated by the machine learning model generation device.

16. A printing device comprising:
the inspection device according to claim 15;
a printing unit that generates a printed matter by performing printing based on the print digital data;
a camera that captures an image of the printed matter; and
an output unit that outputs a detection result of a defect of the printed matter.

17. The printing device according to claim 16, further comprising:
a processing unit that generates processed print digital data in which a defect is expressed by processing at least a part of the learning print digital data,
wherein the printing unit generates a printed matter with a defect by performing printing based on the processed print digital data,
the camera captures an image of the printed matter with a defect, and
the acquisition unit acquires, as the learning inspection data, at least data based on a captured image obtained by capturing an image of the printed matter with a defect.

18. The printing device according to claim 16,
wherein the generation unit generates an adjusted machine learning model suitable for the printing device by adjusting a machine learning model by using learning inspection data based on a captured image obtained by capturing an image of a printed matter by the camera.

19. The printing device according to claim 16,
wherein the printing unit performs printing using an ink jet head.

20. A non-transitory and computer-readable recording medium that causes a computer to execute the machine learning model generation method according to claim 1 in a case where a command stored in the recording medium is read by the computer.

* * * * *